United States Patent

[11] 3,562,505

[72] Inventors Carl A. Barlow, Jr.
    Dallas;
    Eric L. Jones, Dallas, Tex.
[21] Appl. No. 444,554
[22] Filed Apr. 1, 1965
[45] Patented Feb. 9, 1971
[73] Assignee Texas Instruments Incorporated
    Dallas, Tex.
    a corporation of Delaware

[54] METHOD AND SYSTEM FOR GENERATING CONDITIONS REPRESENTATIVE OF REAL AND COMPLEX ZEROS
21 Claims, 6 Drawing Figs.

[52] U.S. Cl. .................................................... 235/156,
    235/150.4, 235/152, 235/184, 235/197
[51] Int. Cl. ....................................................... G06f 7/38,
    G06g 7/32
[50] Field of Search .......................................... 235/152,
    156, 180, 184, 181, 182, 197, 150, 150.3, 150.31

[56] References Cited
UNITED STATES PATENTS
2,915,246  12/1959  Piety ............................ 235/180
3,233,086  2/1966   Schwetman ................... 235/180

OTHER REFERENCES
"Iterative Computation of Complex Roots," by P. A. Samuelson, Journal of Mathematics and Physics, 1949, Vol. 28, pp. 259— 267.

Primary Examiner—Eugene G. Botz
Assistant Examiner—Felix D. Gruber
Attorneys—Samuel M. Mims, Jr., James O. Dixon, Andrew M. Hassell, John E. Vandigriff, Harold Levine and Richards, Harris & Hubbard ABSTRACT: Roots of a function f(z) of a single complex variable quantity z are determined by generating a first sequence of physical conditions, each member of the sequence representing approximations of a root quantity according to the recursive relation $$z_n = \frac{z_{n-2} f(z)_{n-1} - z_{n-1} f(z)_{n-2}}{f(z)_{n-1} - f(z)_{n-2}}$$

where $n$ is an index of the conditions in each sequence. The first sequence is terminated at a first root quantity. Subsequent sequences of the conditions are generated with elimination in each of the subsequent sequence of the effect of all earlier generated root quantities.

METHOD AND SYSTEM FOR GENERATING CONDITIONS REPRESENTATIVE OF REAL AND COMPLEX ZEROS

This invention relates to treatment of signals which have characteristics that may be representative of general mathematical functions, and, more particularly, to production of conditions representative of zeros, poles, and eigenvalues. In a more specific aspect, the invention relates to generation of conditions representative of the real zeros of functions of a single variable, which functions also have one or more complex zeros.

The present invention provides a simple and yet powerful method for generating physical conditions representative of the solutions to two of the more common numerical problems. The method makes possible the efficient generation of conditions which represent the zeros of a complex function, either transcendental or algebraic, of a complex variable. In addition, it is applicable to the generation of conditions representative of eigenvalues of a general matrix in which the parameter may appear in any elements of the matrix in a basically unrestricted way.

For convenience in the following description, the term "roots" will be used to refer to the zeros of a function, recognizing that functions have zeros while equations have roots. The method provides for allowing conditions representative of real roots of a function which also possess complex roots to be found without the difficulties accompanying the well-known secant method.

A problem which occurs frequently is that of determining the roots of a general arbitrary function of a single complex variable $f(z)$, or of the equation $$f(z) = 0. \quad (A)$$

A similar problem is involved in connection with the determination of poles of an arbitrary function. This may be thought of as finding the zeros of its inverse.

A second species of problem which frequently occurs in all branches of engineering involves the determination of those values of a complex parameter $\lambda$ for which nonnull solutions exist to a set of linear algebraic equations:

$$\begin{bmatrix} H_{11}(\lambda)X_1 + H_{12}(\lambda)X_2 + \cdots + H_{1n}(\lambda)X_n = 0 \\ H_{21}(\lambda)X_1 + H_{22}(\lambda)X_2 + \cdots + H_{2n}(\lambda)X_n = 0 \\ \cdot \quad \cdot \quad \cdot \\ \cdot \quad \cdot \quad \cdot \\ \cdot \quad \cdot \quad \cdot \\ H_{n1}(\lambda)X_1 + H_{n2}(\lambda)X_2 + \cdots + H_{nn}(\lambda)X_n = 0 \end{bmatrix} \quad (B)$$

or more concisely $$H(\lambda)X = 0$$

wherein:

$H$ = square matrix of order $n$ whose elements are the coefficients in the equation set; and $$X = \begin{bmatrix} X_1 \\ X_2 \\ \cdot \\ \cdot \\ \cdot \\ X_n \end{bmatrix} = (X_1, X_2, \ldots, X_n)^T$$

This problem is generally referred to as the general eigenvalue problem, where the set $$\{\lambda_j | H(\lambda_j)X_j = 0\}$$

contains the eigenvalues or characteristic numbers and the $$\{X_j\}$$

are the associated eigenvectors or characteristic shapes.

In general, the elements $H_{ij}$ of the given matrix $$H$$

may each depend on $\lambda$ in a rather arbitrary way; however, the most frequently occurring situation is that where $$H \equiv A - \lambda 1$$

where $$1$$

is the identity matrix, whose only nonzero elements are ones along the main diagonal, and $$A$$

is independent of $\lambda$ and usually possesses special symmetry properties. Most of the prior art numerical procedures thus far discovered are only appropriate to this special case. It is the purpose of the present invention to provide an improved and powerful method for solution of the general problem stated above, by systems not heretofore known.

The eigenvalue and root problems are highly related, as may be seen by comparing the form of equations A and C. The method provided here is applicable to the generation of physical conditions representative of solutions to both problems.

In accordance with the invention, physical conditions are generated for a function $f(z)$ of the single complex variable quantity $z$. A first sequence of physical conditions is generated, each representing approximations of a root quantity according to the recursive relation $$z_n = \frac{z_{n-2} f(z)_{n-1} - z_{n-1} f(z)_{n-2}}{f(z)_{n-1} - f(z)_{n-2}} \quad (D)$$

where $n$ is an index of the conditions in each sequence. The first sequence is terminated at a first root quantity. Subsequent sequences of the conditions are subsequently generated with elimination in each of the subsequent sequence of the effect of all earlier generated root quantities.

In accordance with a further aspect of the invention, there is provided a root condition generating system for generating physical conditions related to or definitive of roots of a complex function of a single independent variable. The system is adapted to cooperate with an evaluating unit which produces, on test output channels thereof, output conditions representing two values of the complex function for two starting conditions applied to test input channels. The root condition generating system includes a loop with two input channels and two output channels adapted to be closed by connections to the output channels and input channels, respectively, of the evaluating unit. Means are provided for producing in the system output channels a pair of different sets of conditions which are representative of two complex numbers for application to the evaluating unit. A system control unit actuates the system for repeated cycles in which conditions each representative of complex numbers are generated, progressively approaching values representative of a first root condition.

Comparison means are provided for comparing each system output condition with the next preceding system output condition and for halting operation when the change between successive system output conditions is within set limits.

Means are then provided for modifying, on successive cycles of generation of other root conditions, the character of the output conditions produced by the evaluating unit, the modification primarily being dependent upon conditions representing all earlier generated root conditions to eliminate the effect of the existence of prior roots on subsequent root condition generation.

Preferably, the loop has structure according to the relation $$\frac{z_{n-2}f(z)_{n-1} - z_{n-1}f(z)_{n-2}}{f(z)_{n-1} - f(z)_{n-2}}$$

and the modifying means has structure according to the relation $$\frac{f(z)}{\prod_{i}(z-r_1)} \qquad (E)$$

wherein $i = 1, 2, 3, 4, \ldots n$, and is equal to the number of root conditions previously determined and $\prod_{i}$ symbolically represents the operation $[(z-r_1)(z-r_2)\ldots(z-r_i)]$.

As will hereinafter be shown, operations for generating conditions representative of the roots of functions, of the poles of functions, and of the eigenvalue problem are of generally the same character, and thus the term "root condition" will be used herein as to apply to all of the foregoing categories of operations.

For a more complete understanding of the present invention and for further objects and advantages thereof, reference may now be had to the following description taken in conjunction with the accompanying drawings in which.

GENERAL POLYNOMIAL FUNCTION

The present invention is directed to data processing in which representations of physical phenomena may be produced in any one of several different forms. For the purpose of illustrating the invention, FIGS. 1 and 2 show a system for treatment of signals in electrical form for the generation of output signals representative of the real and complex roots of a signal which behaves in accordance with the polynomial:

$$f(z) = (z^2+1)(z+1) = z^3+z^2+z+1 \qquad (1)$$

Figure 1:
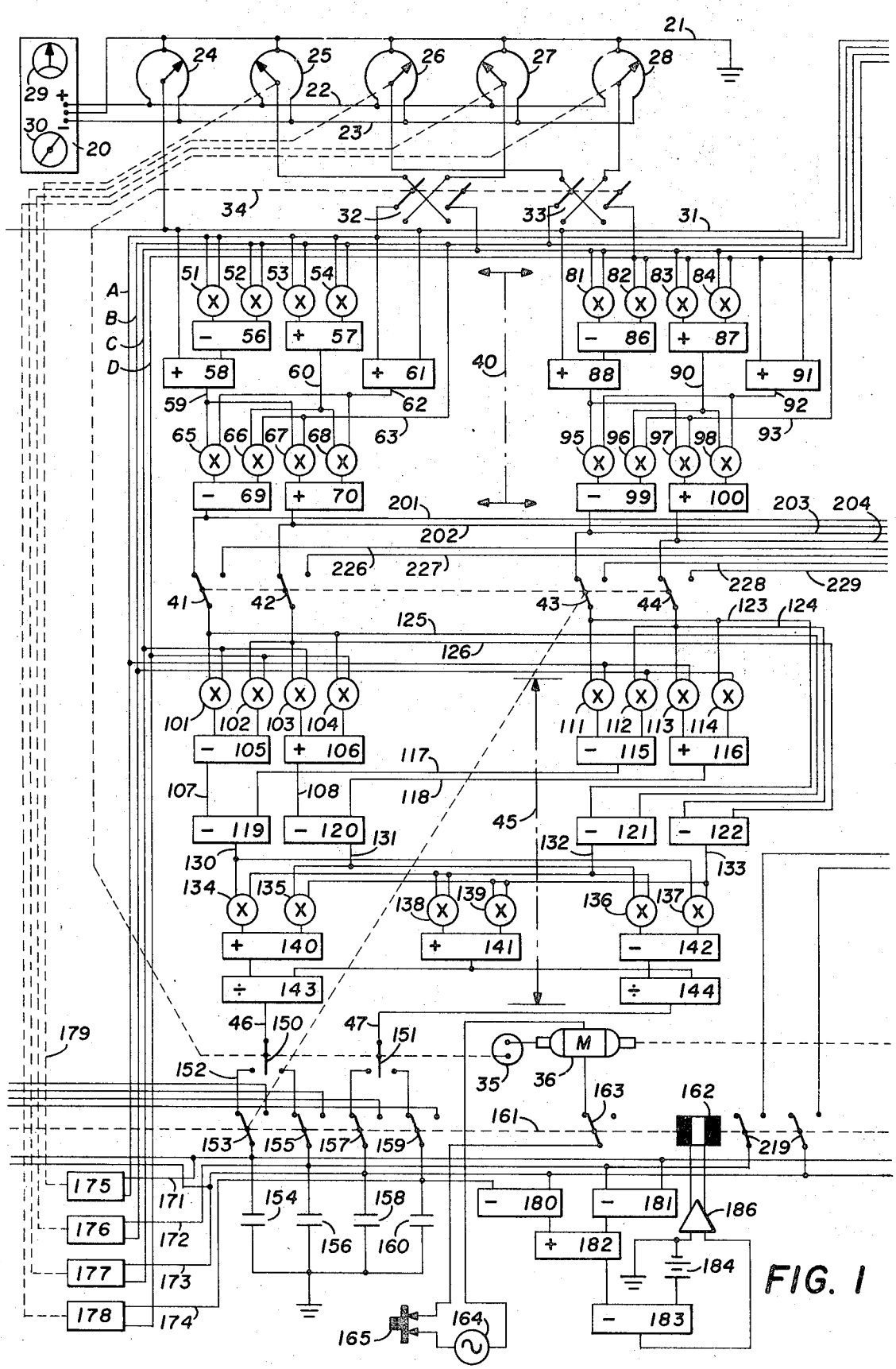
FIG. 1 illustrates a portion of a system for generating conditions representative of roots.
Figure 2:
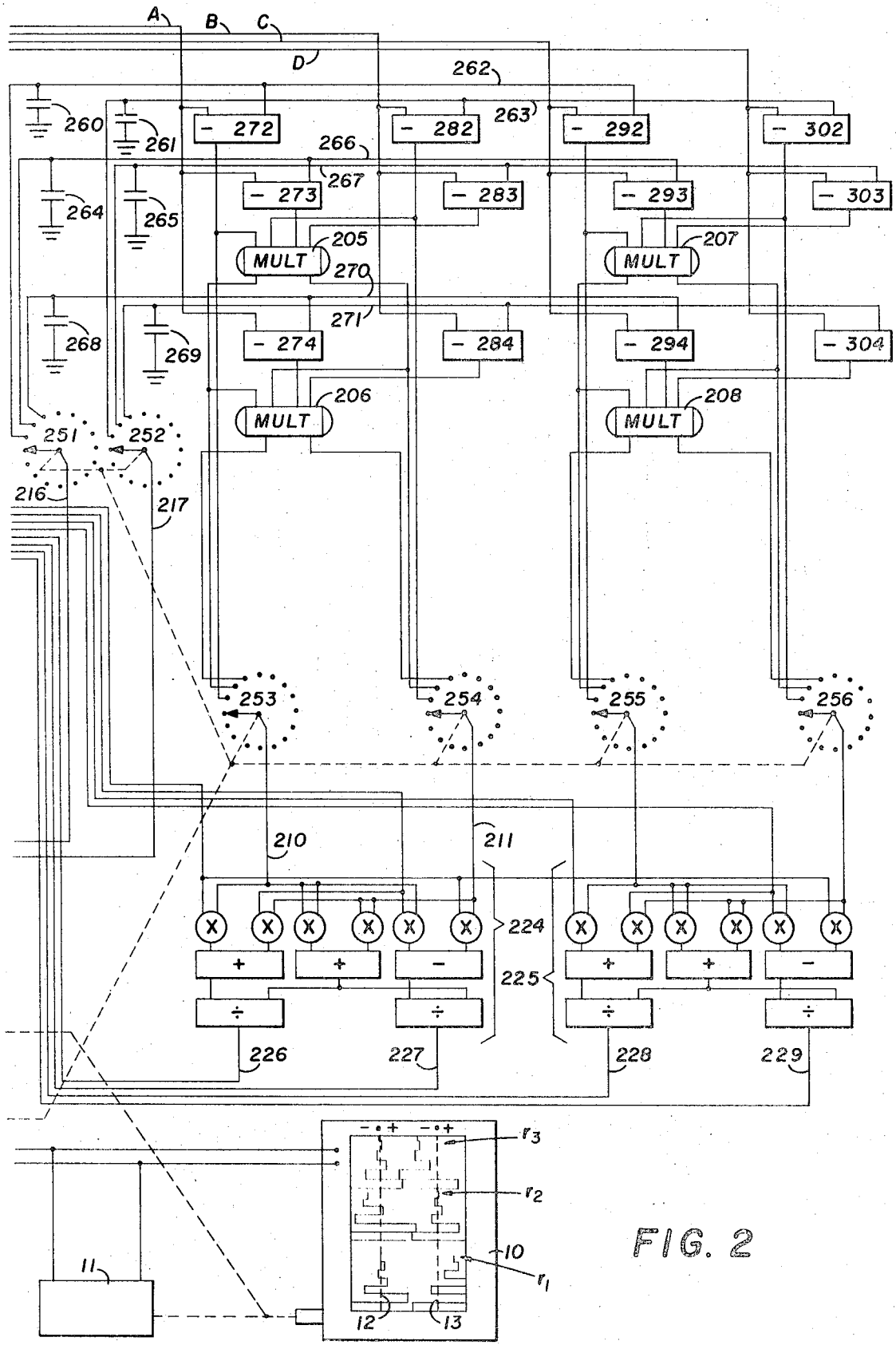
FIG. 2 illustrates that portion of the system for eliminating the effect of roots previously generated in the generation of subsequent roots.

The system of FIGS. 1 and 2 is representative of those systems which are capable of performing the present method. While the present invention is of general application, the particular system for generating electrical conditions representative of the roots of equation 1 will be described. Then there will be described the generation of conditions representative of the roots of the same function by digital computation procedures.

The expression $f(x)_n$, as used throughout the description of the present invention, is equivalent to the expression $f(x_n)$, denoting a function of the variable $x_n$.

As will be set forth in detail, the real and complex roots for a signal which behaves in the manner represented by equation 1 may be produced by a system which may be mathematically characterized by the relationship:

$$z_n = \frac{z_{n-2}f(z)_{n-1} - z_{n-1}f(z)_{n-2}}{f(z)_{n-1} - f(z)_{n-2}} \qquad (2)$$

That is, if two values for $z$ are chosen as starting values $$z_1 = a_1 + ib_1 \qquad (3)$$

and $$z_2 = a_2 + ib_2 \qquad (4)$$

then $z_3$ may be produced by generating signals representing the solution to equation 2 with signals represented by equations 3 and 4 substituted therein to establish the following relationship:

$$z_3 = \frac{(a_1+ib_1)\{[(a_2+ib_2)^2+1](a_2+ib_2+1)\}}{[(a_2+ib_2)^2+1](a_2+ib_2+1)}$$

$$\frac{-(a_2+ib_2)\{[(a_1+ib_1)^2+1](a_1+ib_1+1)\}}{-[(a_1+ib_1)^2+1](a_1+ib_1+1)}, \quad (5)$$

$$z_3 = (a_n + ib_n) \qquad (6)$$

representing the solution to Equation 5.

From the signals $z_2$ and $z_3$, the signals $z_4$ may be generated. This process is then repeated until signals $z_n = (a_n + ib_n)$ are produced where the changes between the signals $(a_n + ib_n)$ and the next preceding signals $(a_{n-1} + ib_{n-1})$ are within predetermined limits, thus indicating that the signal $z_n$ is a first root $r_1$.

In FIGS. 1 and 2, the operations represented by equation 5 are carried out for the complex functions in accordance with the following well-known relationships:

$$i = \sqrt{-1} \qquad (7)$$

$$(a_1+ib_1) + (a_2+ib_2) = (a_1+a_2) + i(b_1+b_2) \qquad (8)$$

$$(a_1+ib_1)(a_2+ib_2) = (a_1a_2 - b_1b_2) + i(a_1b_2 + b_1a_2) \qquad (9)$$

and $$\frac{a_1+ib_1}{a_2+ib_2} = \frac{a_1a_2+b_1b_2}{a_2^2+b_2^2} + i\frac{b_1a_2 - a_1b_2}{a_2^2+b_2^2} \qquad (10)$$

The operations represented by equation 2 are of general application to complex functions to obtain roots. By suitable manipulation, poles of complex functions, as well as eigenvalues of complicated matrices, may be obtained.

In the study of oscillations of such signals as in the example of equation 1, it frequently becomes necessary to find the value of the function for a number of complex arguments. The operation of the system of FIGS. 1 and 2 provides for the evaluation of the polynomial of equation 1 for a series of complex arguments which are varied, by iteration, through a series of steps $z_1, z_2, z_3, \ldots, z_n$ to produce a first complex root $z_n = r_1$. Thereafter, a second root $r_2$ is obtained by operation of the system of FIGS. 1 and 2 with signals modified in accordance with:

$$g_1 = \frac{f(z)_1}{(z_1 - r_1)} \qquad (11)$$

and $$g_2 = \frac{f(z)_2}{(z_2 - r_1)} \qquad (12)$$

The third root signal $r_3$ is then generated with the signals modified in accordance with:

$$h_1 = \frac{f(z)_1}{(z_1 - r_1)(z_1 - r_2)} \qquad (13)$$

and $$h_2 = \frac{f(z)_2}{(z_2 - r_1)(z_2 - r_2)} \qquad (14)$$

Signals representative of each of the three roots $r_1$, $r_2$, and $r_3$ thus are readily obtainable.

FIGS. 1 AND 2

The circuit of FIGS. 1 and 2 will now be described along with its operation to produce signals representative of the three roots $r_1$, $r_2$, and $r_3$.

Referring now to FIGS. 1 and 2, the system will store system output signals on or in a suitable storage medium such as on a record chart in a recorder 10 or a suitable storage register 11. Equation 1 may be recognized as having three roots, each of which may have both a real component and an imaginary component The real component is plotted relative to the zero axis 12 on the chart in the recorder of FIG. 2. The imaginary component is plotted relative to the zero axis 13. Each step in the two output signals from the system is shown on the chart and illustrates the manner in which the output signals might approach the root values $r$, $r$, and $r$.

The system includes a voltage source 20 which has a grounded output line 21, a positive output line 22, and a negative output line 23. Five potentiometers 24—28 are connected across lines 22 and 23 and have their center taps connected to the grounded line 21. Source 20 is provided with a suitable indicating meter 29 and a suitable adjustment control 30 so that voltages may be produced on and applied to the potentiometers 24—28 in the magnitude desired for any particular operation.

The arm on potentiometer 24 is connected to a bus 31. The arms on potentiometers 25 and 27 are connected to terminals of a double-pole, double-throw switch 32. The output terminals of switch 32 are connected to bus lines A and C, respectively.

In a similar manner, the arms of potentiometers 26 and 28 are connected by way of a double-pole, double-throw switch 33 to bus lines B and D. The double-pole, double-throw switches are connected by way of linkage 34 to a cam 35 driven by a motor 36. The switches 32 and 33 are thus periodically reversed so that when the switch arms are in their upper position, the voltages from the arms on potentiometers 25, 26, 27, and 28 are applied to lines A, B, C, and D, respectively. When the switches 32 and 33 are in their lower position, the voltages on the arms of potentiometers 25, 26, 27, and 28 are applied to the bus lines C, D, A, and B, respectively. The voltages on lines A and B represent a first estimate as to a first root of equation 1. Similarly, the voltages on lines C and D represent a second estimate.

That portion of FIG. 1 spanned by arrow 40 serves to evaluate equation 1 for two initial complex arguments $z_1$ and $z_2$. The first complex argument $z_1$ is represented by the voltages on lines A and B. The second complex argument $z_2$ is represented by the voltages on lines C and D. The portion of FIG. 1 located on the left side of arrow 40 produces conditions at switches 41 and 42 representative of the values of equation 1 for the complex arguments $z_1$ represented by the voltages on lines A and B. Similarly, the system on the right side of arrow 40 produces voltages at switches 43 and 44 representative of the solution of equation 1 for the complex arguments $z_2$ represented by the voltages on lines C and D.

That portion of the system spanned by arrow 45 serves to produce output voltages on output lines 46 and 47 which are representative of the solution to equation 2 which represents a third approximation of the first root of equation 1. Thereafter, by iteration, signals are generated which represent the first root $r$ of equation 1.

In FIG. 1, multiplier 51 is connected at both inputs to line A. Multiplier 52 is connected at both inputs to line B. Multiplier 53 is connected at its inputs to lines A and B, respectively. Multiplier 54 similarly is connected to lines A and B, respectively. Output lines from multipliers 52 and 53 are connected to a subtractor 56. The output lines from multipliers 53 and 54 are connected to the inputs of an adder 57. The output line from subtractor 56 is connected to one input of adder 58. The second input to adder 58 is connected to bus 31.

ROOT $r$

For the values of the voltage placed on lines A—D, the voltage on line 31 will be scaled to have a magnitude equal to 1. Thus, there is produced on the output lines 59 and 60 voltages representative of the function $(z^2+1)$. An adder 61 is connected at one input terminal to the line A, and at the second input terminal to the line 31. Thus, on the output lines 62 and 63, there appear voltages representative of the second element of equation 1, i.e., $(z+1)$.

Multipliers 65—68, along with subtractor 69 and adder 70, are then employed to carry out the complex multiplication of equation 1 to produce at switches 41 and 42 voltages representative of the solution to equation 1 for the voltages on lines A and B. The multiplication and addition are carried out in accordance with the relationships set forth in equations 7- —10.

In similar manner, the multipliers 81—84, the subtractor 86 and the adders 87, 88, 91, multipliers 95, 96, 97, and 98, subtractor 99, and adder 100 cooperate to produce voltages at switches 43 and 44 which are representative of the value of equation 1 for the particular voltages applied to the lines C and D.

Multipliers 101, 102, 103 and 104, along with subtractor 105 and adder 106, produce voltages on lines 107 and 108 which are representative of the left side of the numerator of equation 2. Similarly, multipliers 111—114, subtractor 115, and adder 116 produce voltages on output lines 117 and 118 which are representative of the right side of the numerator of equation 2.

More particularly, switch 41 is connected to one input of each of multipliers 101 and 104. Switch 42 is connected to one input of each of multipliers 102 and 103. In addition, line C is connected to one input of each of multipliers 101 and 103. Line D is connected to one input of each of multipliers 102 and 104. Thus, the product signals representing the left side of the numerator of equation 2 are produced on lines 107 and 108. The voltage on line 107 represents the real part of the product, and the voltage on line 108 represents the complex part. Similarly, the voltage on line 117 represents the real part of the right side of the numerator of equation 2, and the voltage on line 118 represents the complex part. The subtraction indicated in the numerator of equation 2 is performed by subtractors 119 and 120 in accordance with equation 8. The subtraction indicated in the denominator of equation 2 is performed by subtractors 121 and 122. It will be noted that the switches 43 and 44 are connected by way of lines 123 and 124 to inputs on subtractors 121 and 122. Similarly, the voltages at switches 41 and 42, as appearing on lines 125 and 126, are applied to the other terminals of subtractors 121 and 122. Thus, the voltages on lines 130 and 131 represent the numerator of equation 2, and the voltages on lines 132 and 133 represent the denominator. The complex division is carried out by multipliers 134—139, adders 140 and 141, subtractor 142, and dividers 143 and 144 in accordance with the operations indicated in equation 10. By this means, there is produced on lines 46 and 47 voltages representative of the value of equation 2 for the initial values of the voltages appearing on lines A, B, C, and D.

With the system thus far described, assume that the switches 32 and 33 are stationary in their upper position. In such case, voltages will be produced on lines 46 and 47 which are representative of a solution to equation 2 for the initial or starting voltages derived from the potentiometers 24—28 and applied to lines A—D.

Under the control of motor 36, the operation is repeated for voltages on the lines A—D which are changed stepwise until the change in the output voltages on lines 46 and 47 as between steps is within predetermined limits. The iterative process is accomplished by applying the voltages on lines 46 and 47 to storage units and then utilizing the stored voltages to adjust, through servolinkages, the positions of the taps on potentiometers 25—28.

More particularly, line 46 is connected to a switch 150. Line 47 is connected to a switch 151. Switches 150 and 151 are actuated by linkage 34 which leads to the cam 35 driven by motor 36. Switches 150 and 151 are single-pole, double-throw switches. One terminal of switch 150 is connected by way of conductor 152 and switch 153 to a storage condenser 154.

The second terminal is connected by way of switch 155 to a storage condenser 156. One terminal of switch 151 is connected by way of switch 157 to condenser 158, and the second terminal of switch 151 is connected by way of switch 159 to storage condenser 160. The condensers 154, 156, 158, and 160 are connected to a common ground terminal. Switches 153, 155, 157 and 159 are single-pole, double-throw switches coupled together by way of linkage 161 to a solenoid 162. A switch 163 in the energizing circuit from motor 36 is also actuated by linkage 161 to control the application of power to motor 36 from a suitable source 164. A manually operated starting switch 165 is provided in series with the source 164 and the motor 36.

Condenser 154 is connected by way of conductor 171 to one input of a servounit 175 which includes a servoamplifier and a servomotor having a mechanical output linkage 179 shown dotted. Condenser 156 is connected through conductor 172 to one input of a second servounit 176. Similarly, condensers 158 and 160 are connected through conductors 173 and 174 to the inputs of servounits 177 and 178, respectively. The other input terminals on the servounits 175—178 are supplied by the voltages on lines A—D, respectively. The servounit 175 serves to control the position of the arm of potentiometer 25 by obtaining equality or balance of the voltages at the servoinput in the manner which is well known. Servounit 176 serves to control the position of the arm of potentiometer 27. Servc unit 177 controls the position of the arm of potentiometer 26 and servounit 178 controls the position of the arm of potentiometer 28.

With the motor 36 energized, the voltage first appearing on lines 46 and 47 will be stored on condensers 154 and 158. This output voltage is then applied to servounits 175 and 177 to adjust the positions of the potentiometers 25 and 26. Simultaneously, the motor 36 reverses the position of switches 32, 33, 150, and 151 so that the voltages from potentiometers 27 and 28 now appear on lines A and B, and the voltages from potentiometers 25 and 26, as adjusted by the servounits 175 and 177, are applied to the lines C and D. The presence of new voltages on lines A—D causes new voltages to be produced on lines 46 and 47. The new voltages are applied to condensers 156 and 160. The latter voltages then actuate the servounits 176 and 178 to readjust the potentiometers 27 and 28. While this is being done, the switches 32, 33, 150, and 151 are again reversed so that successive values of voltages on lines 46 and 47 are stored first on the condensers 154 and 158 and then on condensers 156 and 160. Adjustments are made in the potentiometers 25— 28 responsive to such voltages until such time as the difference between the voltages on condensers 154 and 158 and the voltages on condensers 156 and 160 are relatively small and are within predetermined limits. When the change falls within the limits set, the motor 36 is deenergized. During the foregoing operation, the voltages on lines 46 and 47 are stored and/or recorded as on the chart 10 which shows the steps leading to the root values $r_1$.

Motor 36 is energized and deenergized, in accordance with one aspect of the present invention, by comparing the voltages on condensers 158 and 160 and the voltages on condensers 154 and 156. More particularly, a subtractor 180 is connected to condensers 158 and 160 and a subtractor 181 is connected to condensers 154 and 156. An adder 182 is connected to the outputs of subtractors 180 and 181 and is of the type such that it will produce an output voltage which is equal to the absolute magnitude of the voltages on its two input circuits. The output voltage from adder 182 is applied to one input of a subtractor 183, the second input of which is supplied by a voltage from a battery 184. Battery 184 is adjusted to be equal to the voltage necessary to cause the relay 162 to be energized. Relay 162 is connected to the output of an amplifier 186 whose input is energized by a voltage equal to the difference between the voltage of battery 184 and the voltage at the output of the adder 182. When a large difference voltage appears from either of the subtractors 180 and 181, there will be a large voltage applied to the subtractor 183 so that the voltage of the output of amplifier 186 will be small compared to the voltage necessary to energize the relay 162 as of polarity opposite to that required to operate relay 162. However, when voltages appearing on lines 46 and 47 are sufficiently close to a given root, then the relay 162 will be energized under control of the voltage from the subtractor 183. This action stops the first cycle of the system after having generated voltages which are representative of root $r_1$.

ROOTS $r_2$ AND $r_3$

In order to identify or evaluate a second root, it is then necessary to repeat the cycle operations just described but with the voltages from the outputs of units 69, 70, 99, and 100 adjusted as by operation of that portion of the system shown in FIG. 2.

That portion of the circuit shown in FIG. 2 is provided for successively eliminating the effect of each of the roots $r_1, r_2, r_3$, etc. from the succeeding search for the next root. A key to an understanding of the operation of FIG. 2 and the cooperation thereof with FIG. 1 is expressed in equations 11—14 and more fully depicted in table A, set out below.

It will be remembered that, starting with the voltages $(a_1 + ib_1)$, equation 3, the voltages at the outputs of the units 69 and 70 represent the evaluation of $f(z)$, unique for the given set of starting voltages. Similarly, starting with the voltages $(a_2 + ib_2)$, equation 4, the voltages produced at the outputs of units 99 and 100 represent a second unique evaluation of $f(z)$ for the given set of starting voltages. By applying the voltages at the outputs of units 69, 70, 99, and 100 to the remaining portion of the circuitry of FIG. 1, a third estimate of the root $r_1$ of equation 1 is produced in the form of voltages at output lines 46 and 47. The latter voltages are then substituted for the voltages on line C—D, while the initial voltages on line C—D are substituted for the initial voltages on lines A and B by reversal of switches 32 and 33. The operations $z_1, z_2, z_3 \ldots z_n$ are then followed until the root $r_1$ is obtained. Motor 36 is at this time deenergized and relay 162 is energized. Relay 162 actuates switches 41, 42, 43, and 44 to cause them to be latched into their right-hand positions. Thereafter, in finding the second root $r_2$, the voltages appearing at units 69, 70, 99, and 100 are modified in accordance with equations 11 and 12, respectively. After root $r_2$ is generated, the generation of root $r_3$ is initiated and in this sequence of operation, the voltages appearing at the outputs of units 69, 70, 99, and 100 are modified in accordance with equations 13 and 14.

As indicated, the circuit of FIG. 2 serves primarily to effect the modification represented by equations 11 and 12 or by equations 13 and 14.

More particularly, the voltages on lines A—D are each applied to a plurality of subtractor units. During the search for root $r_2$, voltages representative of the value of $f(z)$ for each of the two starting values $z_1$ and $z_2$ are applied to FIG. 2 by way of conductors 201—204. The voltages on lines 201 and 202 are applied to one pair of inputs of a complex divider 224. Voltages on lines 203 and 204 are applied to one pair of inputs of a complex divider 225.

In FIG. 2, line A is connected to one input of each of subtractors 272, 273, and 274. Line B similarly is connected to subtractors 282, 283, and 284, line C, to subtractors 292, 293, and 294, and line D, to subtractors 302, 303, and 304. The second terminals of subtractors 272 and 292 are connected to the first terminal of stepping switch 251 and to storage condenser 260. The second terminals of subtractors 282 and 302 are connected to the second terminal of stepping switch 252 and to storage condenser 261. The second terminals of subtractors 273 and 293 are connected to the third terminal of stepping switch 251 and to storage condenser 264. Similarly, the second terminals of subtractors 283 and 303 are connected to the third terminal of stepping switch 252 and to storage condenser 265. The second terminals of subtractors 274 and 294 are connected to the fourth terminal of stepping switch 251 and to storage condenser 268, while the second terminals of subtractors 284 and 304 are connected to the fourth terminal of stepping switch 252 and to storage condenser 269.

The outputs of subtractors 272, 282, 292, and 302 are connected to the second terminals of switches 253—256, respectively. The outputs of subtractors 272 and 282 are connected to one pair of inputs of a complex multiplier 205. The second pair of inputs of multiplier 205 are connected to the outputs of subtractors 273 and 283. One output of multiplier 205 is connected to the third terminal of stepping switch 253, while the other output of multiplier 205 is connected to the third terminal of stepping switch 254. The two outputs of multiplier 205 are also connected to one pair of inputs of the complex multiplier 206, the second pair of inputs being supplied by the outputs from subtractors 274 and 284. The outputs of multiplier 206 are connected to the fourth terminal of stepping switches 253 and 254, respectively. Multipliers 207 and 208 correspond with multipliers 205 and 206 and are connected to the circuits leading to the complex divider 225.

The complex multipliers 205, 206, 207 and 208 will be of the type illustrated in FIG. 1 and comprising multiplier elements 65—68, subtractor 69, and adder 70. They have been illustrated in simplified form in FIG. 2.

The arms on stepping switches 253 and 254 are connected by way of conductors 210 and 211 to one pair of inputs of the complex divider 224.

The relay 162 drives six stepping switches 251—256. The stepping switches 251 and 252 serve to apply the voltages representative of roots as they appear on lines 216 and 217 to storage condensers 260 and 261, the latter voltages appearing on lines 262 and 263 leading from the second position terminals on switches 251 and 252. The voltages representative of the second root are stored on condensers 264 and 265, the latter voltages appearing on lines 266 and 267 leading from the third terminals of switches 251 and 252. Voltages representative of the third root are stored on condensers 268 and 269, the latter voltages appearing on lines 270 and 271 leading from the stepping switches 251 and 252.

Voltages representative of the initial values $z_1$ appear on lines A and B. The voltages representative of the initial values $z_2$ appear on lines C and D. Three subtraction units 272—274 are provided for generating voltages representative of the real part of the modified voltages $g_1, h_1, j_1$, of table A for runs 2, 3, and 4, respectively.

Lines 216 and 217 are connected by way of double-pole, single-throw switch 219 to the arms of stepping switches 251 and 252. The switch 219 is controlled by relay coil 162 so that voltages, representative of the first root $r_1$, appear on lines 216 and 217 for storage on capacitors 260 and 261 of voltages which are then applied to subtractors 272, 282, 292 and 302.

The subtraction indicated in the denominator of equation 11 is carried out by subtractors 272 and 282. The subtraction indicated in the denominator of equation 12 is carried out by subtractors 292 and 302. The division of equation 11 is carried out by the complex divider 224. The division of equation 12 is carried out by the complex divider 225. Thus, modified voltages appear at the output of the divider 224 with the voltage representing the real part appearing on output line 226 and the voltage representing the imaginary part appearing on output line 227. Modified voltages also appear at the output of divider 225 with the voltage representing the real part appearing on line 228 and the voltage representing the imaginary part appearing on line 229. Line 226 is connected to the normally open terminal of latching switch 41. Line 227 is connected to the normally open terminal of latching switch 42. Line 228 is connected to the normally open terminal of latching switch 43, and line 229 is connected to the normally open terminal of latching switch 44. By energizing the relay 162, the switches 41—44 are latched to maintain the connections to lines 226—229 so that the generation of root $r_2$ will be independent of root $r_1$.

When the motor 36 is deenergized after generating voltages representative of root $r_2$, the subsequent energization of relay 162 actuates switches 251—256, thereby producing a different set of voltages on lines 226—229. This will immediately cause different voltages to appear on lines 46 and 47, thus causing motor 36 to become energized to initiate the generation of voltages leading to the third root $r_3$.

GENERAL APPLICATION

It will now be apparent that the system of FIGS. 1 and 2 is capable of handling polynomial functions generally. Only that portion of FIG. 1 spanned by arrow 40 is peculiar to or singularly related to the particular function being evaluated. This portion of the system will be made more complex or less complex depending on the function to be evaluated so that there will be produced on output lines 41 and 42 voltages representative of the real and complex parts of the function for a first starting voltage and voltages will be produced on lines 43 and 44 representative of the same function for different starting voltages.

The operation of that portion of the system shown in FIG. 2 serves to eliminate the effect on generation of successive roots of the existence of roots in the system previously generated.

In the system of FIGS. 1 and 2, successive roots are generated in accordance with the set of relationships set forth in table A.

TABLE A

| Voltage on Lines A-D: | Voltages at Switches 42-44 |
|---|---|
| $z_1 = a_1 + ib_1;$ | $f(z)_1;$ |
| $z_2 = a_2 + ib_2;$ | $f(z)_2;$ |
| $z_3 = a_3 + ib_3;$ | $f(z)_3;$ |
| . | . |
| . | . |
| . | . |
| $z_n = a_n + ib_n$ ----------root $r_1$ | |
| $z_1 = a_1 + ib_1;$ | $g(z)_1 = \dfrac{f(z)_1}{z_1 - r_1};$ |
| $z_2 = a_2 + ib_2;$ | $g(z)_2 = \dfrac{f(z)_2}{z_2 - r_1};$ |
| $z_3 = a_3 + ib_3;$ | $g(z)_3 = \dfrac{f(z)_3}{z_3 - r_1};$ |
| . | . |
| . | . |
| . | . |
| $z_n = a_n + ib_n$ ----------root $r_2$ | |
| $z_1 = a_1 + ib_1;$ | $h(z)_1 = \dfrac{f(z)_1}{(z_1 - r_1)(z_1 - r_2)};$ |
| $z_2 = a_2 + ib_2;$ | $h(z)_2 = \dfrac{f(z)_2}{(z_2 - r_1)(z_2 - r_2)};$ |
| $z_3 = a_3 + ib_3;$ | $h(z)_3 = \dfrac{f(z)_3}{(z_3 - r_1)(z_3 - r_2)};$ |
| . | |
| . | |
| . | |
| $z_n = a_n + ib_n$ ----------root $r_3$ | |

$$z_1 = a_1 + ib_1; \quad j(z)_1 = \frac{f(z)_1}{(z_1-r_1)(z_1-r_2)(z_1-r_3)};$$

$$z_2 = a_2 + ib_2; \quad j(z)_2 = \frac{f(z)_2}{(z_2-r_1)(z_2-r_2)(z_2-r_3)};$$

$$z_3 = a_3 + ib_3; \quad j(z)_3 = \frac{f(z)_3}{(z_3-r_1)(z_3-r_2)(z_3-r_3)};$$

.
.
.

$z_n = a_n + ib_n$ --------------------------------- root $r_4$

.
.
.

From the foregoing, it will be seen that equation (E) indicates that in each case the function $f(z)$ will be modified by dividing therein the product $[(z-r_1)(z-r_2)-(z-r_i)]$. Equation (E) thus signifies the operation wherein all previously evaluated roots $r_1, r_2-r_i$ are employed in accordance with the relations of the equation (E) to modify the function $f(z)$. Such a set of voltages is indicated in column 2 of table A.

In the circuit of FIG. 2, voltages are produced for application to switches 41—44 to permit the system to operate on the successive sequences of operations, as to produce voltages representative of a root which is different than the root obtained in the preceding sequence.

It will be recognized that, while equation 1 has only three roots, the circuit of FIG. 2 may be extended to accommodate functions having more than three roots, specific circuitry being shown in FIG. 2. Additional stages of subtraction and multiplication will be connected in tandem as needed, in the manner represented by the subtractors 272—274, and multipliers 205 and 206, with the switches 253 and 254 to evaluate more than four roots. FIG. 2 therefore illustrates the pattern that may readily be followed to add additional units.

STARTING CONDITIONS

The starting voltages $z_1, z_2, z_3, ..., z_n$ have been indicated in table A as being the same for each series of operations leading to roots $r_1, r_2, r_3, ... r_n$, respectively. In principle, the starting voltages may be selected at random for each sequence. Further, the starting voltages for all sequences may be the same. Preferably, however, the voltages are selected as to be located in the region of the root to be generated. For this purpose, the switches 153, 155, 157, and 159 are connected to their right-hand terminals prior to initiating each sequence. Lines 311—314 extend to the circuit of FIG. 3 wherein starting values are generated which are in the general vicinity of the root to be generated. In addition to lines 311—314, the line 31 extends to FIG. 3 along with lines 171 and 173. The starting voltages for generating root $r_1$ are produced by unit 321. The starting voltages for generating root $r_2$ are generated by unit 322; root $r_3$, by unit 323; root $r_4$, by unit 324; and root $r_5$, by unit 325. Line 31 is connected to each of the units 321—325 to supply an input voltage of predetermined value. Output lines 326—330 from units 321—325 extend to a multiterminal stepping switch 331 which is driven by linkage 161 extending from relay 162. The arm of the switch 321 is connected by way of conductor 332 directly to line 311 and by way of a voltage divider 333 to line 313. Line 312 is connected to ground. Line 314 is connected to line 332 by way of a voltage divider 334.

For the generation of the starting voltages for root $r_1$, it will be noted that line 31 is connected to the three inputs of an adder 336, the output of which is connected to a multiplier 337. The second input of multiplier 337 is connected to line 31. The output of multiplier 337 is connected to a divider 338, the second terminal of which is connected to line 31. The output of divider 338 is connected to a subtractor unit 339. Line 31 is also connected to the inputs of a divider 340 whose output is connected to the input of the unit 341 which generates a voltage corresponding with the $n$th root of the output voltage from the divider 340. The output of the unit 341 is connected to the first input of the subtractor unit 339. The output of unit 339 is connected by way of output conductor 326 to the switch 331.

Figure 4:
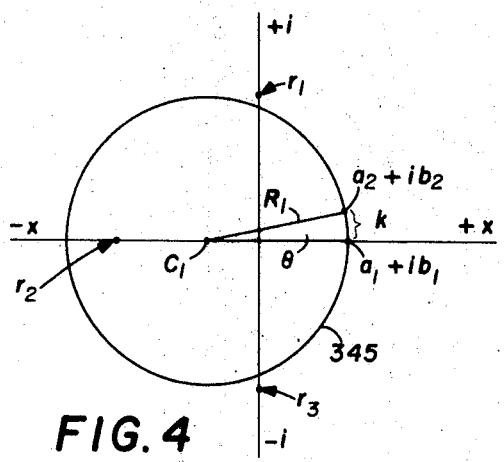
FIG. 4 is a diagram illustrative of the operation of FIG. 3.
Figure 6:
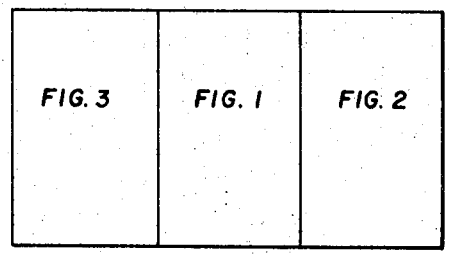
FIG. 6 diagrammatically illustrates the relationship between the drawings of FIGS. 1, 2 and 3.
Figure 3:
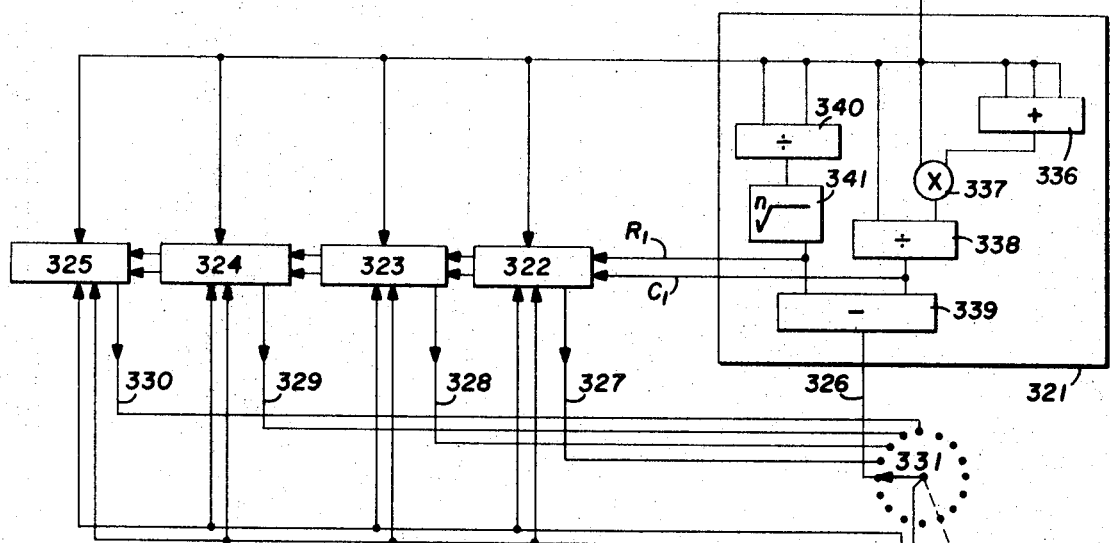
FIG. 3 illustrates that portion of the system for selecting preferred starting voltages.

The operation of the system of FIG. 3 may best be understood by referring to the following relationships and the diagram of FIG. 4. It is known that a preferred set of voltages to start the generation of the first root $r_1$ of a given polynomial, such as the polynomial of equation 1, depends upon the order of the polynomial and upon certain of the coefficients therein. In the polynomial of equation 1, i.e., $f(z) = z^3 + z^2 + z + 1$, a quantity known as the centroid $C_1$, as defined in equation 15, is the centroid of the system with the first root present. The geometric mean radius of the roots relative to the centroid is expressed in equation 16.

In the operation of FIG. 3, a voltage representative of the centroid $C_1$ appears at the output of the divider unit 338. The voltage representative of the radius $R_1$ appears at the output unit 341. For the example of equation 1, the plot of FIG. 4 is representative of the latter voltages. More particularly, the output of the unit 338, corresponding with the centroid $C_1$, would have a value of $(-1/3)$. Thus, the centroid $C_1$ has been plotted in the complex plane of FIG. 4 at $(-1/3 + iO)$. The radius $R_1$ has also been plotted so that the circle 345 represents the locus of radius $R_1$.

In accordance with the present invention, starting voltages are generated which may be represented by points fairly close together on the circle 345. For convenience, the starting voltage $(a_1 + ib_1)$ would have a value of $(0.666 + iO)$. The voltage $(a_2 + ib_2)$ is chosen to be about one-tenth radian displaced from $(a_1 + ib_1)$. For this reason, the connections, shown in FIG. 3, between conductor 332 and conductors 311—314 are employed. The voltage representing the differences between the voltages from units 341 and 338, as produced on line 326, is applied by line 332 to conductor 311. This voltage represents $a_1$. Since the first starting point lies on the $x$-axis, the voltage $ib_1$ is of zero magnitude. Therefore, conductor 312 is connected to ground. The segment K of FIG. 4 represents about 1/10 of a radian and thus the resistances 333 form a voltage divider that applies to conductor 313 a voltage slightly less than the radius $R_1$. Resistors 334 form a voltage divider which applies to conductor 314 the voltage which is about 1/10 of the radius $R_1$ and thus equal to the segment K.

Equation 1 will be found to have roots at $(-1), (+i)$, and $(-i)$ as indicated in FIG. 4. Thus, starting with the first starting values plotted in FIG. 4, root $r_1$ will first be located. Thereafter, the voltages representing the root $r_1$ will be stored in unit 322 in the same manner in which the root voltages are stored, in FIG. 2, on condensers 260 and 261. Additionally, voltages of radius $R_1$ and centroid $C_1$ are stored in unit 322 so that a voltage will be produced and applied to conductor 327, and thence by way of switch 331, to conductor 332 to produce on conductors 311—314 starting voltages for the second root $r_2$.

The relationship between the voltages produced in the system of FIG. 3 may be better understood by referring to the relationships illustrated in equations 15—26 which identify the successive starting voltages. In each case, with the relay 162 of FIG. 1 energized, new voltages are applied to condensers 154, 156, 158, and 160 which cause the relay 162 to be deenergized, thereby starting the search for the next root.

The operations of FIG. 3 are represented mathematically in equations 15—26. To start the generation of voltages representative of root $r_1$, voltages representative of a first centroid $C_1$ and a first radius $R_1$ are generated in accordance with the following relationship:

and
$$C_1 = -\frac{A_1}{nA_0} \quad (15)$$

$$R_1 = \left|\frac{A_n}{A_0}\right|^{\frac{1}{n}} = |f(C_1)|^{\frac{1}{n}}, \text{ where } f(z) = \sum_{i=0}^{n} A_i z^i \quad (16)$$

With the voltages representative of centroid $C_1$ and radius $R_1$ available at the outputs of units 341 and 338, the starting voltages applied to conductors 311—314 are produced in accordance with the following relationships:

$$a_1 + ib_1 = C_1 + R_1 \quad (17)$$
and
$$a_2 + ib_2 = a_1 + i\left(b_1 + \frac{a_1}{10}\right) \quad (18)$$

More accurately, the voltage $a_2$ would be slightly less than $a_1$ and would be equal to $R_1 \cos \theta$. This voltage, for all practical purposes, would be about equal to $R_1$ since $\theta$ is 1/10 radians. From the starting voltages on lines 311—314, the system of FIG. 1 is set into operation to generate voltages representative of root $r_1$. With voltages representative of root $r_1$ stored on condensers 154, 156, 158, and 160, the operation of the system of FIG. 1 terminated, and unit 322 of FIG. 3 then generates voltages representative of the centroid $C_2$ and radius $R_2$ in accordance with the following relationships:

$$C_2 = \frac{nC_1 - r_1}{n - 1} \quad (19)$$
and
$$R_2 = \left|\frac{f(C_2)}{C_2 - r_1}\right|^{\frac{1}{n-1}} \quad (20)$$

With the centroid and radius voltages $C_2$ and $R_2$ known, new starting voltages are generated in accordance with the following relationships:

$$a_1 + ib_1 = (C_2 + R_2) \quad (21)$$
and
$$a_2 + ib_2 = a_1 + i\left(b_1 + \frac{a_1}{10}\right) \quad (22)$$

From the latter starting voltages, the system of FIG. 1 generates voltages representative of root $r_2$. Thereafter, centroid voltages $C_3$ and radius voltages $R_3$ are produced in unit 323 in accordance with the following relationships:

$$C_3 = \frac{(n-1)C_2 - r_2}{n - 2} \quad (23)$$
and
$$R_3 = \left|\frac{f(C_3)}{(C_3 - r_2)(C_3 - r_1)}\right|^{\frac{1}{n-2}} \quad (24)$$

With the centroid and radius voltages $C_3$ and $R_3$ known, new starting voltages are generated in accordance with the following relationships:

$$a_1 + ib_1 = (C_3 + R_3) \quad (25)$$
and
$$a_2 + ib_2 = a_1 + i\left(b_1 + \frac{a_1}{10}\right) \quad (26)$$

From the starting voltages of equations 25 and 26, the system of FIG. 1 then proceeds to generate voltages representative of root $r_3$.

It will be apparent that the successive starting voltages may be evaluated independently of the system of FIG. 3 and that voltages may, at least in part, be manually applied to and stored on condensers 154, 156, 158 and 160 between successive sequences of root voltage generating operations. For example, in FIG. 3 unit 321 may be greatly simplified where the function is equation 1, having coefficients $A_0, A_1, \ldots A_n$, all numerically equal to one. It will immediately be apparent that the first centroid will have a value $C_1 = (-1/3 + i0)$ and that the radius $R_1$ will be equal to one. This would permit selection of the voltages to be stored on the storage condensers of FIG. 1 quite independently of the operation of unit 321 of FIG. 3. A voltage applied to line 332 would result, by means of the connections including dividers 333 and 334 to lines 311—314, in highly desirable starting voltages for FIG. 1. The centroid $C_2$ and the radius $R_2$ would differ from the corresponding values $C_1$ and $R_1$ as indicated in equations 19 and 20. The latter parameters may be determined and starting voltages selected for generation of root $r_2$. Thus, it will be understood that starting voltages may be selected at random; may be the same for all sequences; may be computed and introduced into the system of FIG. 1 by manual operation; or may be generated automatically through the operation of a system of a type indicated in FIG. 3.

POLES OF EQUATION 1

Figure 5:
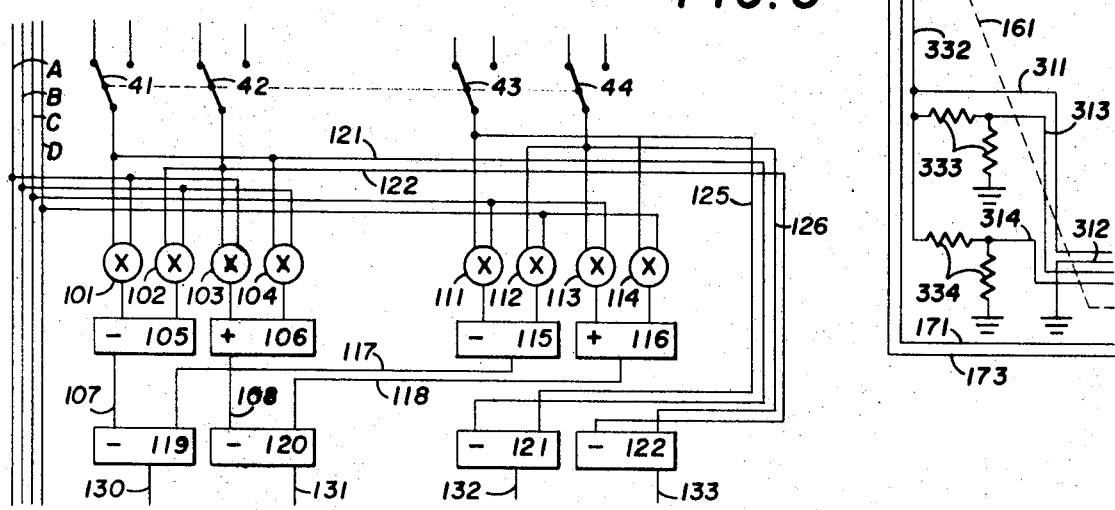
FIG. 5 illustrates a portion of the system of FIG. 1 modified for generation of voltages representative of poles.

The systems shown in FIGS. 1—3 may be employed as above described to identify or generate signals which represent the roots of a function such as equation 1. The same circuit may be employed to identify poles by merely eliminating FIG. 3 and changing connections in FIG. 1 between lines A, B, C, and D and lines 121, 122, 125 and 126. Further, changes are made at connections and at the input lines to subtractors 121 and 122. This portion of the circuit of FIG. 1, with the changes above noted, is illustrated in FIG. 5 wherein the same reference characters are employed as in FIG. 1.

With the circuit of FIG. 1 thus modified, the operation proceeds in accordance with the following equation:

$$z_n = \frac{z_{n-2} f(z)_{n-2} - z_{n-1} f(z)_{n-1}}{f(z)_{n-2} - f(z)_{n-1}} \quad (27)$$

It will be recognized that, in the generation of voltages representative of poles, a far more stringent requirement is placed upon the components of the system of FIG. 1 than in generation of roots, since the voltages representing the functions $f(z)_{n-2}$ and $f(z)_{n-1}$ of equation 27, for example, will become very large at the poles, thus requiring a wide dynamic range in the system. In an analogue system of the type disclosed, poles may be located by symmetry with respect to voltages which reach the limits of the dynamic range of the analogue system. To the extent that the analogue system lacks dynamic range to generate voltages representative of the poles to their precise or accurate pole point, the operation will be limited to an approximation of the poles unless an analytical representation of the inverse of the function can be found which does not require excessive range for the denominator of the resulting function

SYSTEM COMPONENTS

The systems of FIGS. 1 and 2 show schematic representations of circuit components which are well known in the art and for this reason are not shown in detail. The potentiometers 24—28 may be decade-type variable potentiometers of construction and the desired range to provide the voltages for the operation of the system with the accuracy desired. For example, the subtractors may be of the type described in Waveforms, Radiation Laboratory Series, Volume 93, McGraw-Hill (1947) in the section entitled "Addition and Subtraction of Voltages and Currents," page 629. A suitable subtractor is described at page 642 under the heading "Cathode Coupling." Adders are also described in the same section. A suitable adder is shown in FIG. 18.1 at page 631 of the above reference. The multipliers and dividers may be as described in the section entitled "Multiplication and Division" in the above-identified reference. Multipliers such as employed in the circuit 19.1 of the reference may be of the type disclosed in U.S. Pat. No. 2,982,942 to J.E. White. A direct linkage has been indicated from the motor 36 to the drive of recorder 10. It is to be understood that other drive means, such as well-known Selsyn systems, may be employed to coordinate or synchronize the motion of the recorder chart with the operation of motor 36. Servounits 175—178, in general, are well known and may be of the type illustrated and described in Handbook of Automation Computation and Control, by Grabbe et al. John Wiley & Sons, Inc. (1961), page 23.08, and as further and more generally explained in the section of the same work beginning at page 6.23.

The unit 341 of FIG. 3, for generating an output signal representative of the root of the input signal may be of a well-known type, such as that described in Electronic Analogue Computers, by Korn and Korn, McGraw-Hill (1956), and more specifically, as illustrated in table 5, No. 5.5 at page 425.

DIGITAL MODE

The description of FIGS. 1 and 2 has dealt primarily with the use of an analogue system for carrying out the method of the present invention. It will be understood that the method may be practiced through use of systems other than analogues of the type above described in detail. More particularly, each operation embodied in the production of root voltages in FIGS. 1—3 and in FIG. 5 may be carried out through the use of digital computers, which for many operations will be found to be more flexible and versatile. The method, therefore, is not limited to the particular form of analogue apparatus disclosed herein. The analogue system will be found to be helpful in understanding the steps involved and the relationships of the various quantities or conditions produced. On the other hand, a digital system will in general be preferred for use in carrying out the present invention. It is to be emphasized that the method is not limited to the production of the particular roots of equation 1 as above described, but that equation 1 was chosen merely as an example of a low order problem by which the invention might be explained as applied to generation of conditions which represent complex roots of a given signal.

In carrying out the method of the present invention on general purpose digital computers, the operating "system" effectively is built through instructions to the computer by way of a program. While computer programs having a specific objective differ in specific codes or in the manner of expression, there are a number of well known and widely recognized codes routinely used by those skilled in the art. A computer program expressed in one such code for carrying out the present invention on a general purpose computer is set forth in the following tables B—E. The main program appears in table B and is expressed in the familiar computer program language FORTRAN-IV.

Table B

```
$IBFTC UNIV
    SUBROUTINE UNIVR (M,C,D,D1,D2,ICM,LE)
    DOUBLE   PRECISION   U,V,Y0,Y1,Y2,Y3,X,Y,
       XD,YD,CT,CD,CR,CI,CW1,CW2
    DOUBLE PRECISION U1,V1
    DIMENSION C(1),D(1),D1(1),D2(1)
    IF (M.LT.1) GO TO 121
    LX=0
    N=M+1
    LE=1
    ACC=1.E-07
    IPP=ICM+1
    IJ=0
    L=1
    CALL FUN (C,D,U,V,Y0,Y1,1,N)
    CALL JONSTR (M,C,D,D1,D2,IJ,U,V,U1,V1,IPP)
10 CALL FUN (C,D,U,V,Y0,Y1,IPP,N)
11 CONTINUE
    X=U1-U
    Y=V1-V
    CALL REDUCE (D1,D2,Y0,Y1,U,V,IJ)
9 CONTINUE
    CALL FUN (C,D,U1,V,Y2,Y3,IPP,N)
    CALL REDUCE (D1,D2,Y2, Y3,U1,V,IJ)
    XD=Y0-Y2 (Table B, continued)
    YD=Y1-Y3
    IF (XD.EQ.0.) GO TO 19
    CT=YD/XD
    CD=XD+CT*YD
    CR=(X+CT*Y)/CD
    CI=(Y-CT*X)/CD
21 CONTINUE
    X=Y2*CR-Y3*CI
    Y=Y2*CI+Y3*CR
    CW1=U1+X
    CW2=V1+Y
    L=L+1
    IF (L.GT.50)GO TO 22
    TEST=ABS(X)-(ABS(CW1)+1.E-20)*ACC
    TEST 2=ABS(Y)-(ABS(CW2)+E-20)*ACC
    IF (TEST.LT.0. .OR.TEST 2.LT.0.) GO TO 8
    ICNT=0
12 CONTINUE
    U1=CW1
    V1=CW2
    Y0=Y2
    Y1=Y3
    GO TO 9
40 CW2=0. (Table B, continued)
    IF (TEST.GT.0.) GO TO 12
    GO TO 39
38 CW1=0.
    IF (TEST 2.GT.0.) GO TO 12
    GO TO 39
8 ART=ABS(CS2/CW1)
    IF (ART.LT.1.E-12) GO TO 40
    IF (ART.GT.1.E12) GO TO 38
    IF (TEST.LT.0. .AND.TEST 2.LT.0.) GO TO 29
    ICNT=0
    GO TO 12
29 CONTINUE
    ICNT=ICNT+1
    IF (ICNT.LT.2) GO TO 12
39 CONTINUE
    LX=0
    IJ=IJ+1
    D1(IJ)=CW1
    D2(IJ)=CW2
    IF(IJ.GE.M)RETURN
    CALL JONSTR (M,C,D,D1,D2,IJ,U,V,U1,V1,IPP)
23 CONTINUE
    L=1
    GO TO 10 (Table B, continued)
13 ITT=IJ+1
    WRITE (6,106)ITT,CW1,CW2,X,Y
    LE=-1
    RETURN
19 CONTINUE
    IF (YD.EQ.0.) GO TO 20
    CR=Y/YD
    CI=-X/YD
    GO TO 21
20 CONTINUE
    GO TO 39
22 CONTINUE
    LX=LX+1
    IF (LX.GT.20) GO TO 13
    CALL JONSTR (M,C,D,D1,D2,IJ,U,V,U1,V1,5)
    GO TO 23
```

```
121 LE=-1
    WRITE (6,111) M
    RETURN
102 FORMAT (24H RESPONSE DIFF. = ZERO.//)
106 FORMAT (17H ERROR.FAILED ON,I5,36H
    ROOT.LAST VALUE AND INCREMENT
1 ARE //4E20.8)
111 FORMAT (22H ERROR. POLY.DEGREE = I5/)
    END
```

In the program of table B, the following relationships will be understood to be effective:

(a) 
$$f(z) = [C(N) + iD(N)]z^M$$
$$+ [C(N-1) + iD(N-1)]z^{M-1}$$
$$+ [C(1) + iD(1)]$$
$$= \prod_{i=1}^{M} \{z - [D1(I) + iD2(I)]\}$$

where N = M+1.

b. If ICM = 0, all D(i) are equal to 0.
c. If LE is greater than zero, the program has operated without error.
d. If LE is less than zero, error is present.
e. By way of example, consider the command "Call UNIVR (5,C,D,D1,D2,0,LE)". This command implies that there is a polynomial of degree 5 with only real coefficients which are contained in an array labeled C. D is now a dummy array. Roots of the polynomial are returned to the executive program in D1 and D2 arrays for real and imaginary parts. Tests would be made on LE to see whether the executive program should be permitted to continue.

In the same format, the subroutine called for in table B for evaluating a polynomial of the general form $ax^n + ax^{n-1} \ldots an = 0$ is set forth in table C.

TABLE C

```
$IBFTC FUND
    SUBROUTINE FUN (C,D,U,V,A,Y,IG,N)
    DOUBLE PRECISION U,V,VALUR,VALUI,X,A,Y
    DIMENSION C(51),D(51)
    NT = N-1
    GO TO (1,1,6,2)IG.
1 CONTINUE
    RETURN
2 CONTINUE
    VALUR = C(N)
    VALUI = D(N)
    DO 5 I = 1,NT
    J = N-I
    X = VALUR*U-VALUI*V + C(J)
    VALUI= VALUR*V+ VALUI*U+ D(J)
5 VALUR = X
    A = VALUR
    Y = VALUI
    RETURN
6 VALUI = 0.
    VALUR = C(N)
    DO 7 I = 1,NT (Table C, continued)
    J = N-I
    X = VALUR *U + C(J) - VALUI*V
    VALUI = VALUR*V + VALUI*U
7 VALUR = X
    A = VALUR
    Y = VALUI
    RETURN
    END
```

The subroutine called for in table B to locate, from a given polynomial, an estimate of the location in the complex plane of where the roots are located is set forth in table D.

Table D

```
$IBFTC JONS
    SUBROUTINE JONSTR (M,C,D,D1,D2,IJ,U,V,U1,V
    1,IGO)
    DIMENSION C(1),D(1),D1(1),D2(1)
    DOUBLE PRECISION U,V,U1,V1,XC,YC,X,Y
    GO TO (1,2,3,3,4),IGO
1 CONTINUE
    N = M+1
    DO 8 I = 1,N
    IF (C(I).NE.0.) GO TO 9
8 IJ = IJ + 1
9 FN = M-IJ
    RR = ABS(C(N)) (Table D, continued)
    RR = RR**(1./FN)
    YC = 0.
    XC = -C(M)/(FN*C(N)) + 1.0E-6
5 CONTINUE
    IF (IJ.EQ.0) GO TO 21
    DO 20 I = 1,IJ
    D2 (I) = 0.
20 D1 (I) = 0.
21 CONTINUE
    IGO = IGO+2
    XM = 1.
6 CONTINUE
    CALL FUN (C,D,XC,YC,X,Y,IDO,N)
    CALL REDUCE (D1,D2,X,Y,XC,YC,IJ)
    R = (X*X + Y*Y)**(.5/FN)
    R = (R/RR) + 1.0E-6
    U = XC + R
    V = YC
7 CONTINUE
    XA = 0.2*XM
    V1 = YC + R*(SIN(XA)
    U1 = XC + R*COS(XA)
    RETURN
2 CONTINUE (Table D, continued)
    N = M + 1
    DO18I= 1,N
    IF (C(I).NE.0..OR.D(I).NE.0.) GO TO 19
18 IJ = IJ + 1
19 FN = M-IJ
    RR = (C(N)*C(N) + D(N)*D(N))**(.5/FN)
    CN = D(N)/C(N)
    CD = (C(N) + CN*D(N))*FN
    XC = -(C(M) + CN*D(M))/CD+1.0E-6
    YC = -(D(M) - CN*C(M))/CD+1.0E-6
    GO TO 5
3 CONTINUE
    DER = FN*XC - D1(IJ)
    DEI = FN*YC - D2(IJ)
    FN = FN-1.
    XC = DER/FN
    YC = DEI/FN
    GO TO 6
4 XM = XM+ 1.
    XA = XM*0.2
    V = YC + R*SIN(XA)
    U = XC + R*COS(XA)
    XM = XM+1.
    GO TO 7
    END
```

The subroutine called for in table B for reducing or eliminating the effect of previously generated root functions is set forth in table E.

Table E

```
$IBFTC REDS
    SUBROUTINE REDUCE (D1,D2,A,B,U,V,IJ)
```

```
DOUBLE PRECISION A,B,U,V,X,Y,W,Z,R
DIMENSION D1(1),D2(1)
IF (IJ.EQ.0) GO TO 2
DO 1 I = 1,IJ
   X = U−D1(I)
   Y = V−D2(I)
   IF (X.EQ.0.) GO TO 3
   R = Y/X
   Y = X+R*Y
   X = 1./Y
   Y = −R/Y
   GO TO 4
3 CONTINUE
   IF (Y.EQ.0.)Y = 1.E−15
   Y = −1./Y
4 CONTINUE
   Z = A*X−B*Y
   W = A*Y+B*X
   A = Z
   B = W (Table E, continued)
1 CONTINUE
2 CONTINUE
   RETURN
   END
```

ANTENNA PATTERN SYNTHESIS

The method above described has been applied to the problem of radar antenna synthesis. As described in Introduction to Radar Systems, by Skolnik, McGraw-Hill, 1962, beginning at page 320, it is known that an antenna radiation pattern of N elements may be expressed as a polynomial of degree N−1. A given radiation pattern such as shown at page 322, FIG. 7.50a, may represent a radiation pattern for the far field of a multielement antenna. The Fourier analysis of a desired pattern may then be expressed in terms of a polynomial. Generation of roots of such polynomials, in accordance with the present method, permits the determination of the phase and amplitude of the excitation current for each of the elements of the antenna array.

The method has been applied to this and to other special cases for which other methods exist, and has been found to compare extremely favorably with older techniques for handling such cases. The method has also been applied to operations involving sets of linear equations, as described below.

SETS OF LINEAR EQUATIONS

It is known that the condition that the set of linear equations possesses nonnull solutions is equivalent to the determination of those values of $\lambda$ for which the determinant of $$\mathbf{H}$$

vanishes. This restatement of the problem does not always lead directly to numerical analysis using classical methods on the expanded equation. Two problems present themselves. First, if the order, $n$, of the matrix is moderately large, an analytical expansion of the determinant is laborious and time consuming, involving of the order of $n!$ algebraic operations. Secondly, even in the event that the functional expansion of the determinant is available, either analytically or numerically, the determination of the zeros of this function is generally a difficult matter in itself, as in the problem of equation C, above. This is particularly true if N is large or if $$\mathbf{H}$$

depends on $\lambda$ in any but the most elementary fashion. A problem of finding eigenvalues of even a 10th-order matrix whose elements consist of transcendental functions or polynomials in $\lambda$ would present an almost insurmountable task, both analytically and computationally, if prior procedures were used.

The present invention provides a simple solution as the following relationships show. Consider the set of equations $$\mathbf{H X} = \mathbf{Y} \tag{28}$$

where $$\mathbf{Y} = (y_1, y_2, \ldots, y_n)^T$$

is given. Cramer's well-known rule states that $$\mathbf{X}$$

is proportional to $$(\det \mathbf{H})^{-1};$$

thus some component of $$\mathbf{X}$$

will consequently become unbounded as $\lambda$ approaches one of its eigenvalues. Naming the eigenvalues $\lambda_1, \lambda_2, \ldots$ etc. and assuming they are distinct, at least one of the components, for example $X_1$, may be defined as:

$$X_1 \simeq \frac{C_{10}}{(\lambda-\lambda_1)(\lambda-\lambda_2)} \cdots = \frac{C_{11}}{\lambda-\lambda_1} + \frac{C_{12}}{\lambda-\lambda_2} + \cdots, \tag{29}$$

where the numbers, C, are constants (dependent upon $\mathbf{H}$ and $\mathbf{Y}$).

For values of $\lambda$ sufficiently close to one of the eigenvalues, say $\lambda_1$, a further approximation is:

$$X_1 \simeq \frac{C_{11}}{\lambda-\lambda_1} \tag{30}$$

This approximation forms the basis of the procedure which is now described:

1. Arbitrarily choose a set of numbers $$(y_1, y_2, \ldots y_n)^T; \text{ e.g., } (1, 0, \ldots, 0)^T \tag{31}$$

2. Choosing two starting values of $\lambda$, $z_1$ and $z_2$, solve the equations $\mathbf{H}(z)_1 \mathbf{X} = \mathbf{Y}; \mathbf{H}(z)_2 \mathbf{X} = \mathbf{Y}$ for $\mathbf{X}$ $$\tag{32}$$

This requires of order $O(n^3)$ operations by reduction methods.

3. Focusing attention upon one of the components of $\mathbf{X}$, say $x_1$, make the approximations $$X_1(z)_1 \simeq \frac{C_{11}}{z_1-\lambda_1} \text{ and } X_1(z)_2 \simeq \frac{C_{11}}{z_2-\lambda_1} \tag{33}$$

which upon division yield a new estimate of $\lambda_1$:

$$\lambda_1^{(1)} = \frac{z_1 X_1(z)_1 - z_2 X_1(z)_2}{X_1(z)_1 - X_1(z)_2} \tag{34}$$

4. Continue this process to generate the sequence of estimates according to the recursive relation $$\lambda_1^{(R+1)} = \frac{\lambda_1^{(R-1)} X_1(\lambda_1^{(R-1)}) - \lambda_1^{(R)} X_1(\lambda_1^{(R)})}{X_1(\lambda_1^{(R-1)}) - X_1(\lambda_1^{(R)})} \tag{35}$$

5. The sequence converges to an eigenvalue, i.e., to the poles of equation 29 which are zeros of the determinant. This eigenvalue may then be removed by formation of a new function $\overline{X}_1$ $(z) \equiv X_1(z)(\lambda - \lambda_1)$ and the next eigenvalue found employing $\overline{X}_1$. In this manner all the eigenvalues are found in sequence.

Roots of a wide variety of functions characterized by equation A have been generated using the FORTRAN program of tables B—E for the IBM 7040 computer. These functions have ranged from a 46th-degree complex-coefficient polynomial, the roots of which were extracted to 7 decimal digit accuracy (using 36-bit words), to the meromorphic function sech $[(z)^{1/2}]$, the first 10 roots of which were sought and generated accurate to 8 digits. The accuracy to which roots may be generated is limited by the ability to compute the value of the function over the range of the roots. The removal of the effects of roots by redefining the function as specified in equations 11–14 reduces the effects of large differences in magnitudes of roots which is an advantage over other techniques, and effects of the order in which roots are found which also is a decided improvement over prior art methods.

Because the eigenvalue operation and the general rootfinding operation are so common in their nature, the examples which follow relate only to eigenvalue operations. The method has been applied with success to a variety of problems in which the coefficients of the array were nonlinear functions of the eigenvalue. In order to compare the results to previously tested pathological cases, the following examples are of the special form $$(A - \lambda I)\vec{X} = 0$$

Because the present method is completely general, the true test for special cases lies in the accuracy of the roots found rather than speed. This is true because, for large matrices of special form, the present method could not hope to compete, timewise, with prior methods which may and do make use of that particular knowledge. Even in such cases, however, reasonably close initial estimates should tend to balance the scales somewhat. For relatively small matrices, the time difference is quite small, even with poor estimates. In all of the following examples, reduction methods using 36-bit words were employed to compute determinant values.

Example 1

$a_{ii+1} = (i+1)(N+S-)$,
$a_{ii-1} = i(N-i+1)$,
$a_{11} = S - (a_{ii+1} + a_{ii-1})$,
$a_{ij} = 0$, otherwise.

The choices $S = -6.5$, $N = 6$ create a situation of a pair of eigenvectors essentially parallel and lead to the following results, which are compared with prior art methods as indicated in the following tables, and specifically, with the methods disclosed by Eberlein and by Lotkin, as hereinafter set forth.

| True | Eberlein A | Present method |
|---|---|---|
| −3 | −3.0 | −2.9999965 |
| 0 | .0066 | 9.7543543(−5) |
| 2.5 | 2.436 | 2.5003895 |
| 4.5 | 5.103 | 4.5008111 |
| 6 | 5.151 | 6.0041597 |
| 7 | } 7.401±.4051 | { 7.0057354 |
| 7.5 | | { 7.4987409 |

Example 2

$$\begin{bmatrix} 1 & 0 & 10^{-4} \\ 10^{-2} & 1 & 0 \\ 0 & .1 & 1 \end{bmatrix} \longrightarrow$$

| Eberlein B | Present method |
|---|---|
| 1.00464 | 1.0046416 |
| .99768±.004018i | .9976792±.004019731i |

Example 3

$$\begin{bmatrix} 2 & 0 & 0 & 0 \\ 1 & 2 & 0 & 0 \\ 0 & 1 & 2 & 0 \\ 0 & 0 & 1 & 2 \end{bmatrix} \longrightarrow$$

| Eberlein B | Present method |
|---|---|
| 2.008 | 2.0000000 |
| 1.992 | 1.9999999 |
| 2.008 | 2.0000000 |
| 1.991 | 2.0000000 |

Example 4

$$\begin{bmatrix} 1 & 1 & 1 & 1 & 1 & 1 \\ \tfrac{1}{2} & \tfrac{1}{3} & \tfrac{1}{4} & \tfrac{1}{5} & \tfrac{1}{6} & \tfrac{1}{7} \\ \tfrac{1}{3} & \tfrac{1}{4} & & & & \\ \tfrac{1}{4} & \tfrac{1}{5} & & & & \\ \tfrac{1}{5} & \tfrac{1}{6} & & & & \\ \tfrac{1}{6} & \tfrac{1}{7} & \tfrac{1}{8} & \tfrac{1}{9} & \tfrac{1}{10} & \tfrac{1}{11} \end{bmatrix} \longrightarrow$$

| Lotkin | Eberlein B | Present method |
|---|---|---|
| 2.132376 | 2.132376 | 2.1323763 |
| −.2214068 | −.2214066 | −.2214068 |
| −.3184330(−1) | −.3184328(−1) | −.31843305(−1) |
| −.8983233(−3) | −.8983258(−3) | −.89832695(−3) |
| −.1706278(−4) | −.1706200(−4) | −.17063663(−4) |
| −.1394499(−6) | −.1443702(−6) | −.145928(−6) |

Example 5

$$\begin{bmatrix} 5+i & 1 & & 0 \\ & 5+i & & \\ & & 5+i & 1 \\ 0 & & & 5+i \end{bmatrix} \longrightarrow$$

| Eberlein B | Present method |
|---|---|
| 5.00011+.9983i | 4.9999995+1.00000003i |
| 4.99988+1.0016i | 4.9999999+.999999990i |
| 5.00016+.9987i | 5.0000001+.999999994i |
| 4.99984+1.0013i | 5.0000001+1.0000000 |

Example 6

$$\begin{bmatrix} 15 & 11 & 6 & -9 & -15 \\ 1 & 3 & 9 & -3 & -8 \\ 7 & 6 & 6 & -3 & -11 \\ 7 & 7 & 5 & -3 & -11 \\ 17 & 12 & 5 & -10 & -16 \end{bmatrix} \longrightarrow$$

| True | Eberlein B | Present method |
|---|---|---|
| −1 | −.9999 | −1.0000004 |
| 1.50016+3.57064i | 1.505+3.57i | 1.4984986+3.57026555i |
| 1.50016+3.57064i | 1.495+3.57i | 1.5014906+3.571103i |
| 1.50016−3.57064i | 1.505−3.57i | 1.4999583−3.57127705i |
| 1.50016−3.57064i | 1.495−3.57i | 1.4986422−3.57022911i |

For all attempted cases including cases well known to be pathological and presenting difficulties to other methods, the method described herein possesses great advantages.

The method and system above described accommodate electrical signals or other conditions which may represent a wide variety of sets of data. Only that part of the system designated by arrow 40, FIG. 1, is unique to the particular set. The remainder of the system of FIGS. 1 and 2 forms a loop having two input channels 41, 42 and 43, 44, and two output channels A, B, and C, D. The loop is adapted to be closed by the function evaluating unit designated by arrow 40. The control means in FIG. 1 includes motor 36, and the components driven thereby, serve to cause generation of successive iterative conditions, each of such conditions representing complex numbers. The loop has structure dictated by or conforming with the properties of equation 2. As expressed in equation 2, the loop will include units designated by arrow 40. The control means includes the comparison means 180—186, for comparing each system output condition with the next preceding output condition and for causing a stop, by actuation of relay 162, in the operation of the system when the change between successive system output conditions falls within certain limits. The control unit further includes means for restarting the system to run to succeeding stops. That portion of the system shown in FIG. 2 cooperates with the system of FIG. 1 to modify all output conditions from the function evaluating unit which are produced after the first stop in dependence upon the magnitude of each of the system output conditions as stored on condensers 154, 156, 158, and 160, next preceding each stop. The latter system output conditions are stored on condensers 260—261, 264—265, and 269—270, . . . , as representative of roots $r_1, r_2, r_3$ . . . .

The system may be constructed in analogue form as shown in FIGS. 1—3, or it may be constructed in response to a computer program as set out in tables B—E. In either system, physical conditions, for example voltages, are produced to represent functions which are readily described in the shorthand of a mathematician but, nonetheless, accurately described as in the equations employed in the foregoing description and translatable into structure as also described herein.

In the above examples 1—6 the comparisons are made with published results using prior art methods. Eberlein A is more fully detailed in Mathematics of Computations, Volume 18, page 296 (1964). Eberlein B is more fully detailed in The Journal of The Society of Industrial Applied Mathematics, Volume 10, page 74, (1962). Lotkin is more fully detailed in the Quarterly of Applied Mathematics, Volume 14, page 267 (1956).

From the foregoing, it will be seen that the present method is of general utility in generating conditions representative of the complex roots of a function where the function is of such nature that it varies in dependence upon a single complex variable condition. A pair of complex root conditions are first stored to represent different estimates of a first root of the function. Two different function conditions are generated to represent the value of the function for each of the two stored conditions. The members of the pair of stored root conditions are then alternately replaced with successive new root conditions which are produced by subtracting from the product of the second of the root conditions and the first of the function conditions, the product of the first of the root conditions and the second of the function conditions, and then dividing the difference by the difference between the second of the function conditions subtracted from the first of the function conditions. The replacement continues until the difference between the penultimate and end stored root conditions is within a predetermined limit. The end root condition is separately stored. Thereafter, additional end root conditions are generated, with each function condition generated subsequent to the generation of the first end root condition being modified in dependence upon all previously generated end root conditions.

Further, the method may be described in terms of sets of conditions or voltages where a complex function $f(z)$ is involved and electrical signals representative of zeros of such function are to be generated. A first set $S_{z_1}$ of electrical signals may represent a first estimate $z_1$ of the first of the zeros. A set $S_{z_2}$ of electrical signals may represent a second estimate $z_2$ of the first of the zeros. In response to a group of signals representing the function $f(z)$ and to the set $S_{z_2}$ of signals, a set $S_{f(z)_1}$ of electrical signals, representative of $f(z)_1$ is generated. Similarly, in response to the group of signals and to the set $S_{z_2}$ of signals, a set $S_{f(z)_2}$ of electrical signals, representative of $f(z)_2$ is generated.

In response to the sets $S_{z_1}, S_{z_2}, S_{f(z)_1}, S_{f(z)_2}$, of electrical signals, a set $S_{z_3}$ of electrical signals, representative of an estimate $z_3$, is generated, i.e.:

$$z_3 = \left[\frac{z_1 f(z)_2 - z_2 f(z)_1}{f(z)_2 - f(z)_1}\right] \qquad (36)$$

A sequence of sets $S_{z_1}, \ldots, S_{z_{n-2}}, S_{z_{n-1}}, S_{z_n}$, of electrical signals, representative of estimates $z_1, \ldots, z_{n-2}, z_{n-1}, z_n$ of the first zero, is generated wherein the set $S_{z_n}$ of signals is generated in response to $S_{z_{n-1}}$, to $S_{z_{n-2}}$, to the set of electrical signals representative of $f(z)_{n-1}$, and to the set of electrical signals representative of $f(z)_{n-2}$, i.e.:

$$z_n = \left[\frac{z_{n-2} f(z)_{n-1} - z_{n-1} f(z)_{n-2}}{f(z)_{n-1} - f(z)_{n-2}}\right] \qquad (37)$$

In response to the sets $S_{z_n}$ and $S_{z_{n-1}}$ of signals, an electrical condition is generated, representative of the existence of a change between the set $S_{z_{n-1}}$ and the set $S_{z_n}$ which is within predetermined limits. The difference between successive root conditions is compared to a predetermined limiting or error signal. When the difference is equal to or less than said error signal, the generation of a further root condition is terminated and a new routine is started. In response to the electrical condition produced only when the change is within predetermined limits, the generation of the sequence is terminated. Thereafter, in response to the group of electrical signals and to the set $S_{z_n}$ a modified group of electrical signals, representative of $$\left[\frac{f(z)}{z - z_n}\right]$$

is generated and applied in the aforementioned processing steps to the modified group of signals to generate a set of electrical signals, representative of a first zero of $$\left[\frac{f(z)}{z - z_n}\right]$$

, and hence representative of a second zero of $f(z)$.

The system, whether in digital or analogue form, will include means for storing a pair of complex root conditions which represent different estimates of a first root of said function and means for generating two different function conditions representative of the value of the function for each of the stored conditions. Means are provided for generating successive new root conditions and including means for subtracting from the product of the second of the root conditions and the first of the function conditions, the product of the first of the root conditions and the second of the function conditions, and for dividing the difference by the difference between the second of the function conditions subtracted from the first of the function conditions. A feedback system alternately replaces the members of the pair of root conditions with the successively produced new root conditions.

Means are provided for comparing each new root condition with a preceding root condition, and are operative, when the difference between the penultimate and end stored root conditions is within a predetermined limit, to interrupt generation of new root conditions. Means are provided for separately storing each end root condition.

Finally, means are provided for initiating subsequent generation of new root conditions leading to additional end root conditions, including means for modifying each function condition generated subsequent to the generation of the first end root condition in dependence upon all previously generated end root conditions.

Having described the invention in connection with certain specific embodiments thereof, it is to be understood that further modifications may now suggest themselves to those skilled in the art and it is intended to cover such modifications as fall within the scope of the appended claims.

We claim:
1. The method of generating physical conditions representing complex roots of a function f (z) of a single complex variable quantity z which comprises:
   a. generating a first sequence of physical conditions within a computer each representing approximations of a first of said roots according to the recursive relation

$$z_n = \frac{z_{n-2} f(z)_{n-1} - z_{n-1} f(z)_{n-2}}{f(z)_{n-1} - f(z)_{n-2}}$$

where $n$ is the index of the conditions in said sequence,
   b. terminating said sequence in a first root condition, and
   c. successively generating in said computer subsequent sequences of said conditions to produce the second, third, ..., $n$th root conditions, where in the case of each sequence leading to a root condition, prior to each sequence the function f (z) is modified by dividing the condition representative thereof by a condition representative of the product of the differences between the condition upon which the function f (z) depends and the previously stored end root conditions, namely, $$\frac{f(z)}{\prod\limits_{i}(z - r_i)}$$

$i = 1, 2, 3, 4, \ldots n$.

2. The method of generating conditions representative of the complex roots of a function, which function varies in dependence upon a single complex variable condition, which comprises:
   a. inputting to a computer a pair of physically represented complex root conditions which represent different estimates of a first root of said function,
   b. generating in said computer different physical conditions representative of the value of said function for each of the stored conditions,
   c. alternately replacing said complex root condition with successive root conditions produced by subtracting from the product of the second of said root conditions and the first of said function conditions the product of the first of said root conditions and the second of said function conditions, and dividing the difference by the difference between the second of said function conditions subtracted from the first of said function conditions, until the difference between the penultimate and end stored root conditions is below a predetermined limit,
   d. separately storing the end root condition, and
   e. similarly generating in said computer additional end root conditions with each said function condition generated subsequent to the generation of the first end root condition modified by dividing each function condition by a condition representative of the product of the differences between the condition upon which the function condition depends and previously stored end root conditions.

3. The method of claim 2 in which each starting pair of root conditions is representative of points spaced from the centroid of all unknown root conditions a distance of the order of the mean radius of said unknown root conditions.

4. The method of claim 2 in which each starting pair of root conditions is generated in dependence upon the coefficients of elements of said function closely to approximate end root conditions as starting conditions.

5. The method of claim 2 in which the root conditions of said pair are generated to have values in the region of the centroid of all of the roots of said function.

6. The method of generating a pair of voltages representative of the complex roots of a function, which function varies in dependence upon a single complex variable voltage, which comprises:
   a. inputting to a computer a pair of complex root voltages which represent different estimates of a first root of said function,
   b. generating in said computer different function voltages representative of the value of said function for each of said root voltages,
   c. alternately replacing said root voltages with successive root voltages produced by subtracting from the product of the second of said root voltages and the first of said function voltages, the product of the first of said root voltages and the second of said function voltages, and dividing the difference by the difference between the second of said function voltages subtracted from the first of said function voltages, until the difference between the penultimate and end stored root voltages is sufficiently small,
   d. separately storing the end root voltage, and
   e. thereafter generating additional end root voltages with each said function voltage generated subsequent to the generation of the first end root voltage modified by dividing said single complex variable voltage by a voltage representative of the product of the differences between the condition upon which said voltage depends and the previously stored root voltages.

7. The method of generating conditions representative of the complex roots of a function, which function varies in dependence upon a single complex variable condition, which comprises:
   a. inputting to a computer a pair of complex root conditions which represent different estimates of a first root of said function,
   b. generating in said computer different function conditions representative of the value of said function for each of the root conditions,
   c. alternately replacing the members of said pair with successive root conditions produced by subtracting from the product of the second of said root conditions and the first of said function conditions, the product of the first of said root conditions and the second of said function conditions, and dividing the difference by the difference between the second of said function conditions subtracted from the first of said function conditions, until the difference between the penultimate and end stored root conditions is within predetermined limits,
   d. separately storing the end root condition, and
   e. thereafter generating additional end root conditions with each said function condition generated subsequent to the generation of the first end root condition modified by dividing said single complex variable condition by a condition representative of the product of the differences between the condition upon which said single complex variable condition depends and the previously stored root conditions.

8. The method of generating conditions representative of the complex poles of a function, which function varies in dependence upon a single complex variable condition, which comprises:
   a. inputting to a computer a pair of complex pole conditions which represent different estimates of a first pole of said function,
   b. generating in said computer different function conditions representative of the value of said function for each of the root conditions,
   c. alternately replacing the members of said pair with successive pole conditions produced by subtracting from the product of the second of said pole conditions and the second of said function conditions, the product of the first of said pole conditions and the first of said function conditions, and dividing the difference by the difference between the first of said function conditions subtracted from the second of said function conditions, until the difference between the penultimate and end stored pole conditions is sufficiently small,
   d. separately storing the end pole condition, and
   e. thereafter generating additional end pole conditions with each said function condition generated subsequent to the generation of the first end pole condition modified by dividing said single complex variable condition by a condition representative of the product of the differences between the condition upon which said single complex variable condition depends and the previously stored root conditions.

9. The method of generating physical conditions representing complex roots of a function f (z) of a single complex variable quantity z which comprises:
   a. generating a first sequence of physical conditions each representing approximations of a first of said roots according to the recursive relation $$z_n = \frac{z_{n-2}f(z)_{n-1} - z_{n-1}f(z)_{n-2}}{f(z)_{n-1} - f(z)_{n-2}}$$

where $n$ is the index of conditions in said sequence,
   b. terminating said sequence in a first root condition, and
   c. generating subsequent sequences of said conditions to produce the second, third, ..., $n$th root conditions, where in the case of each sequence leading to a root condition, and in number corresponding with the order of said function f (z) with elimination in each said subsequent sequence of the effect of all earlier generated root conditions by dividing the condition representative of f (z) by a condition representative of the product of the difference between said condition upon which f (z) depends and the previously stored end root conditions.

10. The method of generating physical conditions representing complex roots of a function f (z) of a single complex variable quantity z which comprises:
    a. generating a first sequence of physical conditions each representing approximations of a first of said roots according to the recursive relation $$z_n = \frac{z_{n-2}f(z)_{n-1} - z_{n-1}f(z)_{n-2}}{f(z)_{n-1} - f(z)_{n-2}}$$

where $n$ is the index of conditions in said sequence,
    b. terminating said sequence in a first root condition, and
    c. successively generating subsequent sequences of said conditions to produce the second, third, ..., $n$th root conditions, where in the case of each sequence leading to a root condition, with modification in each said subsequent sequence of the conditions representative of the quantities f $(z)_n{-}_1$ and f $(z)_n{-}_2$ by dividing the condition representative of the quantity f $(z)_n{-}_1$ by the product $1(z-1)$ and by dividing f $(z)_n{-}_2$ by a condition representative of the quantity $2(z-2)$ to eliminate the effect of all earlier generated root conditions.

11. The method of producing physical representations of the roots of a complex function f (z) which comprises:
    a. generating a first set of starting conditions $z_1$ representative of a first estimate of the location of a first root,
    b. generating a second set of starting conditions $z_2$ representative of a second estimate of the location of said first root,
    c. generating a third set of starting conditions $z_3$ representative of a third and improved description of the location of said first root according to the relation $$z_n = \frac{z_{n-2}f(z)_{n-1} - z_{n-1}f(z)_{n-2}}{f(z)_{n-1} - f(z)_{n-2}}$$

where $n=3$,
    d. thereafter substituting members of the series $z_3, z_4, ..., z_n$ for representations of $z_1$ and $z_2$ in the sequence $z_3$ for $z_1, z_4$ for $z_2, z_5$ for $z_3$ ..., until the change between conditions representing $z_n{-}_1$ and $z_n$ is within the predetermined limits whereby conditions $z_n$ represent said first root, and
    e. repeating the aforementioned steps with successive modification of the conditions representative of the functions $f(z)_n{-}_2, f(z)_n{-}_3...$, the modification being in accordance with the relation $$\frac{f(z)}{\prod_i^\pi (z-r_i)}$$

$i = 1, 2, 3, 4, ... n$ to eliminate the effect therein of root functions previously generated.

12. The method of processing a group of electrical signals representative of values of a complex function f (z) to produce electrical signals representative of the value of roots of said function which comprises:
    a. generating a set $S_{z_1}$ of electrical signals, representative of a first estimate $z_1$ for the first of said roots,
    b. generating a set $S_{z_2}$ of electrical signals, representative of a second estimate $z_2$ for said first of said roots,
    c. generating, in response to said group of signals and to said set $S_{z_2}$ of signals, a set $S_{f(z)_1}$ of electrical signals, representative of a value $f(z)_1$,
    d. generating, in response to said group of signals and to said set $S_{z_2}$ of signals, a set $S_{f(z)_2}$ of electrical signals, representative of $f(z)_a$—'
    e. generating, in response to said set $S_{z_1}$, $S_{z_2}$, $S_{f(z)_1}$, $S_{f(z)_2}$, of electrical signals, a set $S_{z_3}$ of electrical signals, representative of an estimate $z_3$, wherein $$z_3 = \left[\frac{z_1 f(z)_2 - z_2 f(z)_1}{f(z)_2 - f(z)_1}\right]$$

f. generating a sequence of sets, $S_{z_1}, ..., S_{z_{n-2}}, S_{z_n}$ of electrical signals representative of estimates $z_1, ..., z_{n-2}, z_{n-1}, z_n$ of said first root wherein the set $S_{z_n}$ of signals is generated in response to $S_{z_{n-1}}$, to $S_{z_{n-2}}$, to a set of electrical signals representative of f $(z)_n{-}_1$, and to a set of electrical signals representative of f $(z)_n{-}_2$, and wherein $$z_n = \left[\frac{z_{n-2}f(z)_{n-1} - z_{n-1}f(z)_{n-2}}{f(z)_{n-1} - f(z)_{n-2}}\right]$$

g. generating in response to the sets $S_{z_n}$ and $S_{z_{n-1}}$ of signals, an electrical condition representative of whether the change in the set $S_{z_{n-1}}$ of signals from the set $S_{z_n}$ of signals is within predetermined limits,
    h. terminating the generation of said sequence, in response to said electrical condition, when said condition is indicative that said change is within said limits, and
    i. generating, in response to said group of electrical signals and to said set $S_{z_n}$, another group of electrical signals representative of $$\left[\frac{f(z)}{z-z_n}\right]$$

and applying the aforementioned processing steps to said another group of signals to generate a set of electrical signals, representative of a first root of $$\left[\frac{f(z)}{z-z_n}\right]$$

and hence representative of a second root of f (z).

13. A method according to claim 12 wherein the step of generating a set $S_1$ of electrical signals comprises:
    a. generating in response to said group of electrical signals, a set $S_{zc}$ of electrical signals representative of the centroid, $zc$, of the value of the roots of f (z),
    b. generating in response to said group of electrical signals and to said set $S_{zc}$ of signals, a set $S_{Rm}$ of electrical signals representative of the mean radius, Rm, of the roots of f(z) about $zc$ and c. generating in response to said set $S_{zc}$ of signals and to said set $S_{Rm}$ of signals the set of electrical signals $S_{z1}$ representative of $z_1$, wherein $|z_1 - zc| = Rm$.

14. The method according to claim 12 wherein the step of generating the set $S_{z_3}$ of electrical signals includes the steps of:
   a. generating in response to said sets $S_{z_1}$, $S_{z_2}$, $S_{f(z)_1}$, and $S_{f(z)_2}$, the set $S_{(z_3-z_2)}$ of electrical signals representative of the value of the quantity $$(z_3 - z_2) = (z_2 - z_1)\left[\frac{f(z)_2}{f(z)_2 - f(z)_1}\right]$$

and b. generating in response to said set $S_{(z_3-z_2)}$ and said set $S_{z_2}$, the set $S_{z_3}$ of electrical signals.

15. The method according to claim 12 wherein said step of generating an electrical condition comprises:
   a. generating, in response to the set $S_{z_{n-1}}$ and $S_{z_{n-2}}$ of signals, a set of test electrical signals representative of whether the variation from the set $S_{z_{n-1}}$ of signals to the set $S_{z_{n-2}}$ meets a predetermined criterion, and
   b. generating, in response to the sets $S_{z_n}$ and $S_{z_{n-1}}$ of signals and to said set of test electrical signals, said electrical condition representative of whether both said variation and the change in the set $S_{z_n}$ of signals from the set $S_{z_{n-1}}$ meet said predetermined criterion and thereby whether said change is within said predetermined limits.

16. The method of generating physical root conditions for a function f(z) of a single complex variable quantity z which comprises:
   a. applying signals representing said function to means for generating a first sequence of physical conditions within a computer, each of said conditions representing approximations of said root quantity according to the recursive relation $$z_n = \frac{z_{n-2}f(z)_{n-1} - z_{n-1}f(z)_{n-2}}{f(z)_{n-1} - f(z)_{n-2}}$$

where $n$ is the index of the condition in said sequence,
   b. terminating said sequence in a first root condition, and
   c. applying modified function signals to means for successively generating in said computer subsequent sequences of said conditions after modifying prior to each sequence the function f(z) by dividing the condition representative thereof by a condition representative of the product of the differences between the condition upon which the function f(z) depends and the previously stored end root conditions, namely, $$\frac{f(z)}{\prod_i^\pi (z - r_i)}$$

$i = 1, 2, 3, 4, \ldots n$.

17. The method of generating electrical root signals for a function f(z) of a single complex variable quantity z which comprises:
   a. generating a first sequence of electrical signals within a computer each representing approximations of said root quantity according to the recursive relation $$z_n = \frac{z_{n-2}f(z)_{n-1} - z_{n-1}f(z)_{n-2}}{f(z)_{n-1} - f(z)_{n-2}}$$

where $n$ is the index of the electrical signals in said sequence,
   b. terminating said sequence in a first electrical root signal, and
   c. successively generating in said computer subsequent sequences of said signals after modifying prior to each sequence the function f(z) by dividing the signal representative thereof by a signal representative of the product of the differences between the signal upon which the function f(z) depends and the previously stored electrical end root signals, namely $$\frac{f(z)}{\prod_i^\pi (z - r_i)}$$

$i = 1, 2, 3, 4, \ldots n$.

18. A system of generating physical conditions representative of complex roots of a function f(z) of a single complex variable quantity z which comprises:
   a. a generator for producing a series of plural number sequences of electrical physical conditions and including structure for generating each member of the sequence as to represent an approximation of a first of said roots according to the recursive relation $$z_n = \frac{z_{n-2}f(z)_{n-1} - z_{n-1}f(z)_{n-2}}{f(z)_{n-1} - f(z)_{n-2}}$$

where $n$ is the index of the condition in said sequence,
   b. means connected to said generator for terminating each said sequence in a root condition in response to a variation between one said condition and a next preceding condition which is within a preset limit, and
   c. means responsive to said electrical physical conditions and operative in each sequence subsequent to the first sequence in said series for modifying the function f(z) in accordance with the relation $$\frac{f(z)}{\prod_i^\pi (z - r_i)}$$

$i = 1, 2, 3, 4, \ldots n$.

19. A signal treating system for generating physical conditions related to roots of a complex function of a single independent variable condition which comprises:
   a. an evaluating unit for producing a pair of output conditions on output channels representing the values of the complex function in response to a pair of given starting conditions applied to test input channels of the evaluating unit,
   b. a loop with two input channels and two output channels coupled to the output channels and input channels, respectively, of the evaluating unit,
   c. means for producing in said output channels of said loop a pair of different sets of conditions which are representative of complex numbers for application to the evaluating unit input channels,
   d. control means including means for generating successively iterative solution conditions of said complex function representative of complex numbers where said loop has structure according to the relation $$\frac{z_{n-2}f(z)_{n-1} - z_{n-1}f(z)_{n-2}}{f(z)_{n-1} - f(z)_{n-2}}$$

where $z_1, z_2, \ldots, z_n$ are successive sets of system output conditions, said control means having a control unit means for comparing each system output condition with the next preceding output condition and for causing a stop in operation of the system when the change between successive system output conditions is within predetermined limits and for restarting the system to run to succeeding stops, and
   e. means connected with said evaluating unit for modifying all output conditions from said evaluating unit after the first said stop in dependence upon the magnitude of each of the system output conditions next preceding each said stop in accordance with the relation $$\frac{f(z)}{\prod_{1}^{\pi}(z-r_i)}$$

$i = 1, 2, 3, 4, \ldots n.$

20. A system for generating conditions representative of the complex roots of a function, which function varies in dependence upon a single complex variable condition, which comprises:
   a. means for storing a pair of conditions which represent different estimates of a first root of said function,
   b. means for generating different function conditions representative of the value of said function for each of the stored conditions,
   c. means for generating new root conditions including means for subtracting from the product of the second to be obtained of said root conditions and the first to be obtained of said function conditions, the product of the first used of said root conditions and the second used of said function conditions, and for dividing the difference by the difference between the second of said function conditions subtracted from the first of said function conditions,
   d. a feedback system for alternately replacing the members of said pair with successive new root conditions,
   e. means for comparing each new root condition with a preceding root condition and operative, when the difference between the penultimate and end stored root conditions is within a predetermined limit, to interrupt generation of new root conditions,
   f. means for separately storing each end root condition, and
   g. means for initiating subsequent generation of new root conditions leading to additional end root conditions and including means for modifying each said function condition generated subsequent to the generation of the first end root condition by dividing said single complex variable condition by a condition representative of the product of the differences between the condition upon which said single complex variable condition depends and the previously stored root conditions.

21. A system for generating voltages representative of the complex roots of a function, which function varies in dependence upon a single complex variable, which comprises:
   a. means for storing a pair of voltages which represent different estimates of a first root of said function,
   b. means for generating different function voltages representative of the value of said function for each of the stored voltages,
   c. means for generating new root voltages including means for subtracting from the product of the second to be obtained of said root voltages and the first to be obtained of said function voltages, the product of the first used of said root voltages and the second used of said function voltages, and for dividing the difference by the difference between the second of said function voltages subtracted from the first of said function voltages,
   d. a feedback system for alternately replacing the members of said pair with successive new root voltages,
   e. means for comparing each new root voltages with a preceding root voltage and operative, when the difference between the penultimate and end stored root voltages is within a predetermined limit, to interrupt generation of new root voltages,
   f. means for separately storing the end root voltages, and
   g. means for initiating subsequent generation of new root voltages leading to additional end root voltages wherein means are provided for modifying each said function voltage generated subsequent to the generation of the first end root voltage by dividing said single complex variable condition by a condition representative of the product of the differences between the condition upon which said single complex variable condition depends and the previously stored root conditions.